US007256831B2

(12) United States Patent
Iizuka

(10) Patent No.: US 7,256,831 B2
(45) Date of Patent: Aug. 14, 2007

(54) METHOD FOR DRIVING AN IMAGING DEVICE AND IMAGE PICKUP DEVICE, WHEREIN SIGNALS CORRESPONDING TO SAME COLOR OUTPUTS ARE COMBINED

(75) Inventor: Tetsuya Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 687 days.

(21) Appl. No.: 10/736,095

(22) Filed: Dec. 15, 2003

(65) Prior Publication Data

US 2004/0125223 A1 Jul. 1, 2004

Related U.S. Application Data

(62) Division of application No. 09/251,792, filed on Feb. 17, 1999, now Pat. No. 6,686,960.

(30) Foreign Application Priority Data

Feb. 18, 1998 (JP) .............................. P10-036152

(51) Int. Cl.
*H04N 5/335* (2006.01)

(52) U.S. Cl. ...................................... 348/315; 348/311

(58) Field of Classification Search ........ 348/311-322; 250/208.1; 257/443-448
See application file for complete search history.

(56) References Cited

U.S. PATENT DOCUMENTS 5,166,799 A * 11/1992 Hasegawa et al. .......... 348/252
5,287,192 A 2/1994 Iizuka
5,719,624 A 2/1998 Sasaki et al.
5,847,758 A 12/1998 Iizuka
5,966,174 A * 10/1999 Yamamoto et al. ......... 348/319
6,169,577 B1 1/2001 Iizuka
6,441,849 B1 8/2002 Fukuda
7,034,876 B2 * 4/2006 Harada ........................ 348/319
2001/0043275 A1 * 11/2001 Hirota et al. ............... 348/312

FOREIGN PATENT DOCUMENTS

EP 0 936 806 A2 8/1999
JP 09-055952 A 2/1997

* cited by examiner

*Primary Examiner*—Tuan Ho
(74) *Attorney, Agent, or Firm*—Robert J. Depke; Rockey, Depke, Lyons & Kitzinger LLC.

(57) ABSTRACT

Systems and methods allow driving a solid-state image pickup apparatus at high-speed operation by reducing a number of different samples in the horizontal and vertical directions. In an exemplary embodiment, three or more odd-numbered pixels are incorporated into a single block and signal charges from same color outputs are added within transfer registers such that an average center of the pixels coincides with a pixel at a center of the block. Three transfer electrodes are preferably provided for a column of a vertical transfer register in a part of the vertical transfer register on a side of the horizontal transfer register. The three transfer electrodes may be formed from one layer of three different gate electrode layers. The vertical registers may be arranged in a three column cycle. Preferably, an imaging device employing this structure has a switching mode of operation between a mode in which mixed charges that result from adding signal charges of predetermined pixels from one block are output and a normal mode for outputting all pixel information.

2 Claims, 20 Drawing Sheets

| | | | | | | | |
|---|---|---|---|---|---|---|---|
| | | | | | | | |
| B41<br>B21<br>(B) | G42<br>G22<br>(G) | B43<br>B23<br>(B) | G44<br>G24<br>(G) | B45<br>B25<br>(B) | G46<br>G26<br>(G) | B47<br>B27<br>(B) | G48<br>G28<br>(G) |
| (G)<br>G31<br>G11 | (R)<br>R32<br>R12 | (G)<br>G33<br>G13 | (R)<br>R34<br>R14 | (G)<br>G35<br>G15 | (R)<br>R36<br>R16 | (G)<br>G37<br>G17 | (R)<br>R38<br>R18 |

| | | | | | | | |
|---|---|---|---|---|---|---|---|
| G51 | R52 | G53 | R54 | G55 | R56 | G57 | R58 |
| B41 | G42 | B43 | G44 | B45 | G46 | B47 | G48 |
| G31 | R32 | G33 | R34 | G35 | R36 | G37 | R38 |
| B21 | G22 | B23 | G24 | B25 | G26 | B27 | G28 |
| G11 | R12 | G13 | R14 | G15 | R16 | G17 | R18 |

| | | | | | |
|---|---|---|---|---|---|
| B | G | B | G | B | G |
| G | R | G | R | G | R |
| B | G | B | G | B | G |
| G | R | G | R | G | R |
| B | G | B | G | B | G |
| G | R | G | R | G | R |

| | | | | | |
|---|---|---|---|---|---|
| G91 + G71 | R92 + R72 | G93 + G73 | R94 + R74 | G95 + G75 | G96 + G76 |
| | | | | | |
| B61 + B41 + B63 + B43 | R34 + R14 + R36 + R16 | B65 + B45 + G35 + G15 | G64 + G44 + G66 + G46 | G37 + G17 + G39 + G19 | G68 + G48 + R38 + R18 |

METHOD FOR DRIVING AN IMAGING DEVICE AND IMAGE PICKUP DEVICE, WHEREIN SIGNALS CORRESPONDING TO SAME COLOR OUTPUTS ARE COMBINED

RELATED APPLICATION DATA

The present application is a divisional of U.S. application Ser. No. 09/251,792, filed Feb. 17, 1999 now U.S. Pat. No. 6,686,960, which claims priority to Japanese Patent Application No. P10-036152, filed Feb. 18, 1998. The present application claims priority to this previously filed application. The subject matter of application Ser. No. 09/251,792, is incorporated herein by reference.

BACKGROUND OF THE INVENTION

1. Field of the Invention

The present invention relates to a method for driving a solid-state image pickup apparatus comprising e.g. a CCD register, a solid-state image pickup device and a camera comprising the solid-state image pickup device.

2. Description of the Related Art

The number of pixels in the solid-state image pickup device has remarkably increased with the progress of technology. With such an increase of the number of pixels, a function to reduce the amount of output data during one frame period as the need arises is strongly desired.

For example, in an electronic still camera, when taking a picture, priority is given to the resolution of a still picture for causing the CCD image pickup device to output e.g. 500 lines at a speed of e.g. 30 frames/sec. On the other hand, when viewing through an electronic finder, priority is given to the dynamic resolution for causing the device to output 250 lines at a speed of 60 frames/sec.

Unfortunately, according to this method, signals for the remaining 250 lines are not used and discarded.

Contrary to this, the applicant of this application has previously invented a technique for deriving signals from adding together signal charges apart by two pixels from each other in the vertical direction within a vertical transfer register (see Patent Gazette of Laying-Open No. 9-55952).

Due to this technique, it has become possible, in a solid-state image pickup apparatus having a color filters arranged repeatedly in a cycle of two vertical pixels, to mix signal charges of two pixels without discarding the signal charges and at the same storing time.

FIG. 1 is a conceptional diagram of the signal transfer by the CCD solid-state image pickup apparatus in this case.

Concerning the color filters, what is called Bayer's arrangement color filters are employed in which they are arranged in a two pixel cycle in both vertical and horizontal directions, greens G within each cycle being arranged diagonally in a checkered pattern, blues B and reds R being arranged in the remaining checkers, as shown in FIG. 2.

Letters in FIG. 2 denote colors of the filters (red R, green G, blue B) and numerals denote coordinates of pixels represented by row and column numbers (mn for the m-th row and the n-th column), respectively.

In FIG. 1, circle marks indicate positions of the weight center of the added signals and letters within the circle marks denote corresponding colors (red R, green G, blue B). Further, symbols shown outside the circle marks denote coordinate positions of the added components in FIG. 2.

First of all, signals corresponding to the first row G11, R12, G13, R14, etc. and signals corresponding to the third row G31, R32, G33, R34 etc. are added together inside the solid-state image pickup device to form signals having the weight centers in the second row of the color filters (G11+G31, R12+R32, G13+G33, R14 R34, etc.).

Also, signals corresponding to the second row B21, G22, B23, G24, etc. and signals corresponding to the fourth row B41, G42, B43, G44, etc. are added together inside the image pickup device to form signals having the weight centers in the third row of the color filters (B21+B41, G22+G42, B23+B43, G24+G44, etc.).

By using this method, signal charges of four pixels in the vertical direction can be made two signals and therefore the number of lines in the vertical direction can be made half, thus allowing the amount of data in one frame to be reduced.

According to the driving method described above, however, while the number of lines in the vertical direction can be made half and the amount of data in one frame can be reduced, a balance of resolutions in the horizontal direction and in the vertical direction will deteriorate in case of square grid pixels.

Specifically, though not shown in FIG. 1, because signals corresponding to the fifth row are added to those corresponding to the seventh row to form signals having the weight centers in the sixth row, these signals will be located four pixels apart from the same color signals which are derived from adding signals corresponding to the first row to signals corresponding to the third row to form signals having the weight centers in the second row.

Accordingly, for example, intervals between the same color pixels are two pixel intervals in the horizontal direction, whereas such intervals in the vertical direction are four pixel intervals, thus making the vertical resolution lower than the horizontal resolution.

Moreover, when the amount of data in one frame is to be reduced further using this method, the balance of the horizontal and vertical resolutions will become worse. For example, when one million, three hundred thousand pixel CCD having a normal speed of 15 frames/sec is operated at a speed of 60 frames/sec, the vertical resolution will go to one fourth.

Because it is necessary to reduce further the amount of data in the horizontal direction in order to overcome the foregoing problem, the present inventor proposed a method for driving the solid-state image pickup apparatus which enables the amount of data in the horizontal direction to be reduced by applying the aforesaid method for reducing the amount of data in the vertical direction.

FIG. 3 is a conceptional diagram of the signal transfer in the solid-state image pickup apparatus where the amount of data in the horizontal direction is reduced in addition to the reduction of the amount of data in the vertical direction. The arrangement of color filters is the same as that of FIG. 2.

In FIG. 3, circle marks denote positions of the weight center of the added signals and letters within the circle marks denote corresponding colors. Additionally, symbols shown outside the circle marks denote coordinate positions of the added components in FIG. 2.

Signals corresponding to four pixels G11, G13, G31, G33 of green G located in the left lower part of FIG. 2 are added together inside the solid-state image pickup device to form a single signal having the weight center in the position G22.

Likewise, signals corresponding to four pixels of blue B, namely, B21, B23, B41, B43 form a single signal having the weight center in the position R32. Signals corresponding to four pixels of red R, namely, R12, R14, R32, R34 form a single signal having the weight center in the position B23.

Signals corresponding to four pixels of green G, namely, G22, G24, G42, G44 form a single signal having the weight center in the position G33.

According to this method, even when the color filters in a 2×2 cycle are used, it was possible to reduce the number of samples to one fourth inside the CCD solid-state image pickup device and further to solve the problem of asymmetry between the horizontal direction and the vertical direction.

By the way, when constructing the solid-state image pickup apparatus which is capable of switching between a normal outputting process and the outputting process for reducing the number of samples as the need arises, it is preferable to use the same algorithm for processing signals in those two outputting processes, if possible.

Furthermore, if samples are equal in number, it is preferable that a spacial distance relation among sample points is uniform, which enables the higher resolution and enable the conventional method for processing signals to be applied, thereby giving an advantage to make simpler of the signal processing.

According to the solid-state image pickup apparatus illustrated in FIG. 3, the weight center of samples (the position of G22) of the added signals of G11, G13, G31, G33 is one pixel apart from the weight center of samples (the position of B23) of the added signals of R12, R14, R32, R34, whereas the weight center of samples (the position of B23) of the added signals of R12, R14, R32, R34 is three pixels apart from the weight center of samples (the position G26) of the added signals of G15, G17, G35, G37.

In other words, it is possible to extract from signals output by the CCD solid-state image pickup apparatus signals in the same order as that of the original arrangement of color filters, whereas the symmetrical nature with respect to the parallel spacial distance relation carried by the original color filters is spoiled.

Thus, due to the non-uniformity of spacial distance relation in the arrangement of sampling points, it was difficult to apply the conventional algorithm in processing signals.

SUMMARY OF THE INVENTION

In order to overcome the foregoing problem, an object of the present invention is to provide a method for driving a solid-state image pickup apparatus, a solid-state image pickup device and a camera which enables fast operation and makes applicable of the conventional algorithm in processing signals by reducing the number of samples in the horizontal direction and in the vertical direction.

The method for driving the solid-state image pickup apparatus according to the present invention is such that three or more odd number pixels are made one block, signal charges of predetermined pixels being thinned out to be transferred to transfer registers, resulting signal charges being added together within the transfer registers so that the weight center of pixels (center of pixels) may coincide with a pixel at the center of one block and resulting mixed charge being transferred.

According to the above described method for driving the solid-state image pickup apparatus of the present invention, by thinning out the signal charges of predetermined pixels of one block made up of three or more odd number pixels for transferring them to transfer registers and adding them together so that the weight center of pixels (center of pixels) may coincide with the central pixel of one block, it will be possible to reduce the amount of data without spoiling the symmetrical property.

The method for driving the solid-state image pickup apparatus according to the present invention is such that three pixels in the horizontal direction of a solid-state image pickup apparatus comprising a solid-state image pickup device formed by pixels in a two-dimensional arrangement are made one block, signal charges of two pixels except the middle of each block being added, and a signal charge of a pixel in the middle of the block being added to a signal charge of a pixel in the middle of the adjacent block.

According to the above method for driving the solid-state image pickup apparatus of the present invention, signal charges of six pixels in two blocks come to three added signal charges and therefore, the amount of data in the horizontal direction is reduced to its half.

The solid-state image pickup device according to the present invention is such that the device comprises pixels in a two dimensional arrangement having vertical registers and a horizontal register, three transfer electrodes being provided per one column of the vertical registers in a part of the vertical registers on the side of the horizontal register, these three transfer electrodes being formed of one gate electrode layer of three different gate electrode layers and being arranged in a cycle of three columns of the vertical registers.

According to the above-mentioned solid-state image pickup device of the present invention, because the three transfer electrodes provided in a part of the vertical registers on the side of the horizontal register are formed of one gate electrode layer of three different gate electrode layers, it will be possible to form the transfer electrodes on the side of the horizontal register and the transfer electrodes on the opposite side of these three transfer electrodes by two layers of the three layers. Besides, only three layers are sufficient for the gate electrode layers to be used including the vertical and horizontal registers.

Moreover, by arranging these three transfer electrodes in a cycle of three columns of the vertical registers, it will be possible to control the transfer of signal charges based on blocks each of which is made of the three columns.

The camera according to the present invention has such a mode of operation that three pixels in the horizontal direction of the solid-state image pickup apparatus comprising the solid-state image pickup device including pixels in a two-dimensional arrangement are made one block, a signal charge of a pixel in the middle of the block being added to a signal charge of a pixel in the middle of the adjacent block, resulting mixed charge being removed outside the solid-state image pickup device, and mixed charge derived from adding signal charges of two pixels except the middle of each block being utilized as an effective signal output. The camera is arranged to have a mode of switching between the above-mentioned mode and a normal of taking a picture.

According to the above-described camera of the present invention, because it has the mode of operation in which the mixed charge derived from adding the signal charge of the pixel in the middle and the signal charge of the middle pixel in the adjacent block is removed outside the solid-state image pickup device, and the mixed charge derived from adding the signal charges of two pixels except the middle of each block is utilized as an effective signal output, thereby making in this mode one effective signal output to be obtained from three pixels of one block, it will be possible to reduce the amount of data to one third. This enables a faster operation than usual one and therefore it will be possible, for example, to view through a finder or to monitor a picture taking area using this mode or the like.

The method for driving the solid-state image pickup apparatus according to the present invention is such that a total of nine pixels including three pixels in the horizontal direction and three pixels in the vertical direction of the solid-state image pickup apparatus comprising the solid-state image pickup device including pixels of the two-dimensional arrangement having the vertical registers and the horizontal register are made one block, signal charges of six pixels except three pixels of the middle row in each block being transferred from a light receiving storage unit to the vertical registers, signal charges of four pixels except two pixels of the middle column, out of signals of six pixels in each block transferred to the vertical registers being added, and signal charges of two pixels of the middle column in a block and signal charges of two pixels of the middle column in the adjacent block, i.e. signal charges of four pixels in total being added together.

According to the above-mentioned method for driving the solid-state image sensing apparatus of the present invention, because signal charges of eighteen pixels in two blocks become three added signal charges, the amount of data will be reduced.

The camera according to the present invention has such a mode of operation that a total of nine pixels including three pixels in the horizontal direction and three pixels in the vertical direction of the solid-state image pickup apparatus comprising the solid-state image pickup device having pixels in a two-dimensional arrangement are made one block, signal charges of two pixels in the middle column without the middle row in each block, being added to signal charges of two pixels in the middle column without the middle row in the adjacent block inside the solid-state image pickup device, mixed signal charge derived therefrom being removed outside the solid-state image pickup device, and mixed charge derived from adding signal charges of four pixels at four corners of each block inside the solid-state image pickup device being utilized as an effective signal output. The camera is arranged to have a mode of switching between the above-mentioned mode and a normal mode of taking a picture.

According to the above-described camera of the present invention, because it has the mode of operation in which the mixed charge derived from adding the signal charge of two pixels in the middle column except the middle row and the signal charge of two pixels in the middle column except the middle row in the adjacent block is removed outside the solid-state image pickup device, and the mixed charge derived from adding the signal charges of four pixels at four corners of each block is utilized as the effective signal output, thereby making in this mode one effective signal output to be obtained from nine pixels of one block, it will be possible to reduce the amount of data to one ninth. This enables a faster operation than usual one and therefore it will be possible, for example, to view through the finder or to monitor the area for taking a picture using this mode or the like.

BRIEF DESCRIPTION OF THE DRAWINGS

FIG. 21E is a diagram showing the transfer state of signal charges in the adding operation in the horizontal and vertical directions;

DESCRIPTION OF THE PREFERRED EMBODIMENTS

Figure 1:
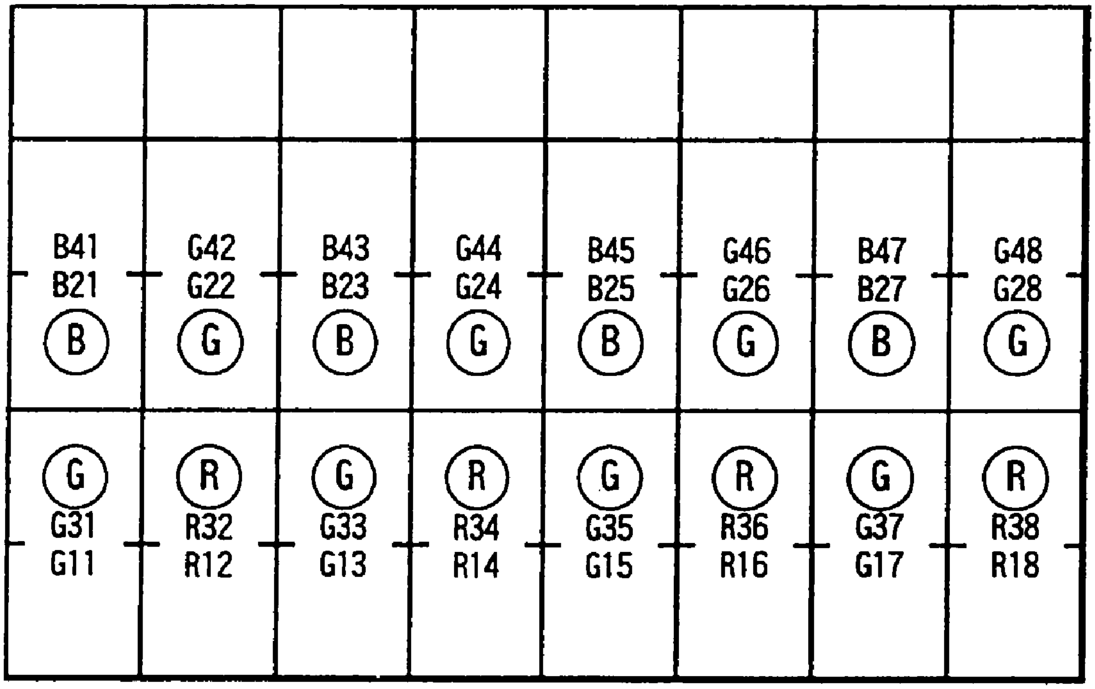
FIG. 1 is a conceptional diagram of the signal transfer in a solid-state image pickup apparatus for obtaining signals that signal charges two pixels apart in the vertical direction are added within vertical transfer registers.

The present invention provides a method for driving a solid-state image pickup apparatus in which three or more odd number pixels are made one block, signal charges of predetermined pixels being thinned out to be transferred to a transfer register, resulting signal charges being added together within the transfer register so that the weight center of pixels (center of pixels) may coincide with a center pixel of one block and resulting mixed charge being transferred.

The present invention provides the method for driving the solid-state image pickup apparatus which has pixels each provided with a received light storage unit and a vertical register (interline transfer type or frame interline transfer type) or a vertical register with a light receiving function (frame transfer type) and which comprises a solid-state image pickup device including pixels in the two-dimensional arrangement having a horizontal register, wherein three pixels in the horizontal direction are made one block, signal charges of two pixels except the middle of each block being added inside the solid-state image pickup device, and a signal charge of the one middle pixel in the block being added inside the solid-state image pickup device to a signal charge of the one middle pixel in the adjacent block.

The present invention provides a solid image pickup device having pixels provided with a received light storage unit and a vertical register or a vertical register with the light receiving function and including the two-dimensional arrangement with a horizontal register, wherein three transfer electrodes are provided per one column of the vertical register in a part of the vertical register on the side of the horizontal register, the three transfer electrodes being formed of one gate electrode layer of three different gate electrode layers, and the three transfer electrodes being arranged in a cycle of three columns of the vertical registers.

The present invention provides also the solid-state image sensing device described above, wherein the transfer electrode adjacent to the horizontal register of the three transfer electrodes is formed from two gate electrode layers of the three different layers, whereas the transfer electrode on the opposite side to the horizontal register is formed of two gate electrode layers including a gate electrode layer not used for the transfer electrode adjacent to the horizontal register out of the three different layers.

The present invention provides a camera which has such a mode of operation that three pixels in the horizontal direction in the solid-state image pickup apparatus comprising the solid-state image pickup device including pixels in the two-dimensional arrangement are made one block, the signal charge of one middle pixel in the block being added inside the said-state image pickup device to the signal charge of one middle pixel in the adjacent block, resulting mixed charge being removed outside the solid-state image pickup device, and mixed charge derived from adding signal charges of two pixels except the middle of each block within the image pickup device being utilized as the effective signal output, and which is arranged to have a mode of switching between the above mode and a normal mode of taking a picture.

The present invention provides the method for driving the solid-state image pickup apparatus which has pixels provided with the received light storage unit and the vertical register or the vertical register with a light receiving function and which comprises the solid-state image pickup device including pixels in the two-dimensional arrangement having the horizontal register, wherein a total of nine pixels including three pixels in the horizontal direction and three pixels in the vertical direction are made one block, signal charges of six pixels in each block except three pixels of the middle row being transferred from the received light storage unit to the vertical register, signal charges of four pixels except two pixels of the middle column out of signal charges of six pixels of each block transferred to the vertical register being added inside the image pickup device, and signal charges of two pixels of the middle column in the block and signal charges of two pixels of the middle column in the adjacent block, i.e. signal charges of four pixels in total being added inside the image pickup device.

The present invention provides the camera which has such a mode of operation that a total of nine pixels including three pixels in the horizontal direction and three pixels in the vertical direction in the solid-state image pickup apparatus comprising the solid-state image pickup device including pixels in the two-dimensional arrangement are made one block, the signal charges of two pixels in each block except the middle row of the middle column and the signal charges of two pixels of the middle column in the adjacent block, i.e. signal charges of four pixels in total being added inside the solid-state image pickup device, resulting mixed signal being removed outside the solid-state image pickup device, and mixed charge derived from adding signal charges of four pixels at four corners of each block inside the solid-state image pickup device being utilized as the effective signal output, and which is arranged to have a mode of switching between the above-mentioned mode and the normal mode of taking a picture.

Figure 4:
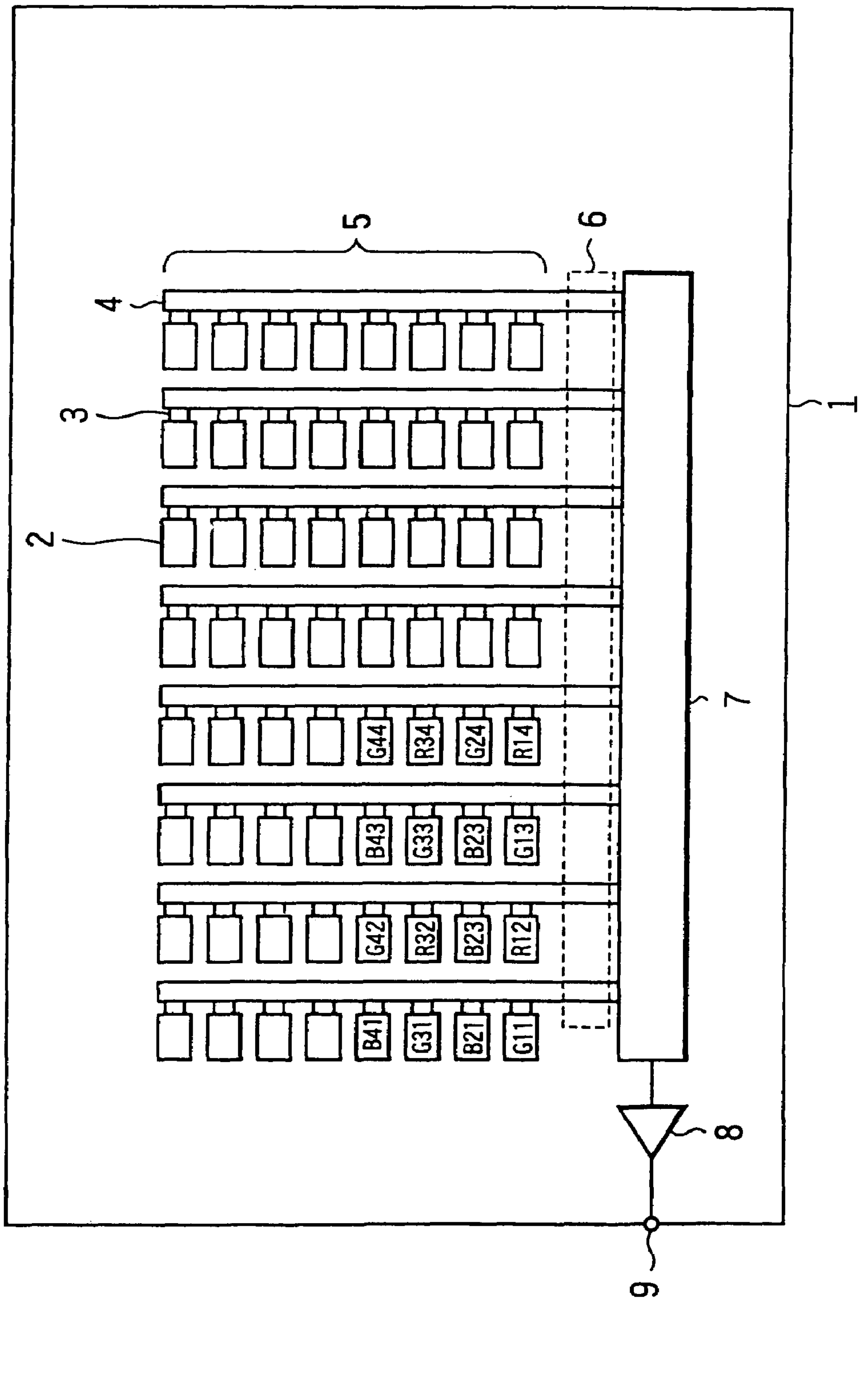
FIG. 4 is a schematic structure diagram (plan view) of a color CCD solid-state image pickup apparatus according to the present invention.

FIG. 4 is a plan view showing a schematic structure of a color CCD solid-state image pickup apparatus according to an embodiment of the present invention.

In the color CCD solid-state image pickup apparatus, each pixel is provided with a photodiode 2, a vertical CCD register 4 and a readout gate 3 for controlling these elements and whole pixels form an image pickup area 5. Between the image pickup area 5 and a horizontal CCD register 7 and in an extended portion of the vertical CCD registers 4, there is a control register section 6 which is shaded from the light though not shown and handles the transfer between the vertical CCD register 4 and the horizontal CCD register 7.

The color CCD solid-state image pickup apparatus 1 is an interline transfer type CCD solid-state image pickup apparatus in which charges of all photodiodes 2 are transferred simultaneously to the vertical CCD register 4 and each charge is not mixed in the vertical CCD register 4 and can be transferred vertically by each independent packet of the vertical CCD register 4, which is a so-called all pixel readout CCD image pickup apparatus.

In addition, an extended area of the vertical CCD register 4 may be enlarged to form a frame interline transfer type CCD solid-state image pickup apparatus.

Furthermore, a color filter is provided on each pixel and light signals of three colors, red R, green G and blue B are acquired through respective filters, thus forming the color CCD solid-state image pickup apparatus 1.

Figures 5, 6:
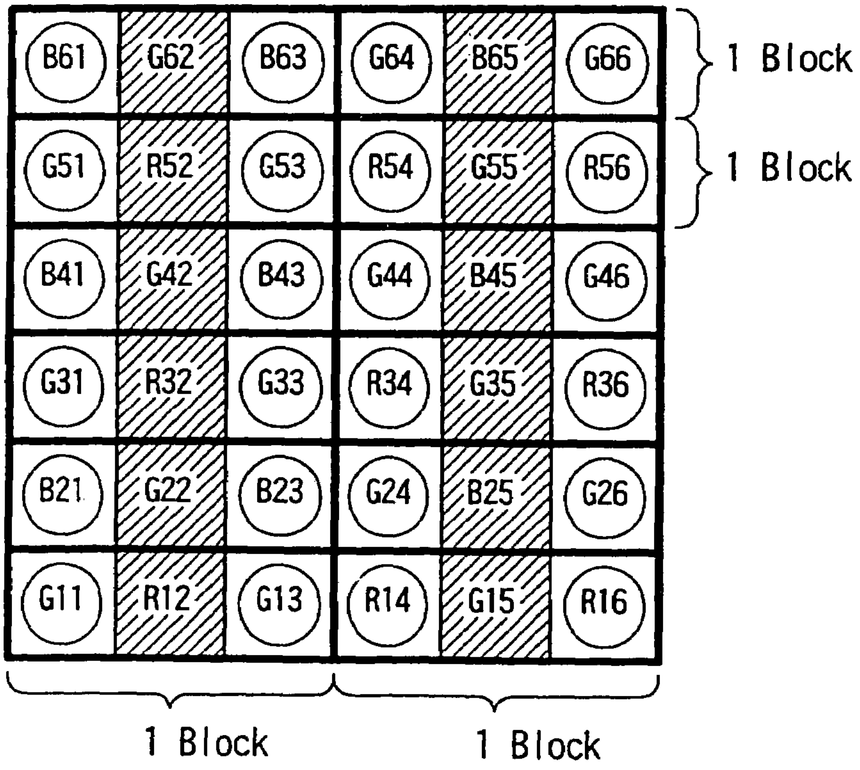
FIG. 5 is a plan view showing the arrangement of color filters used for the color CCD solid-state image pickup apparatus shown in FIG. 4.
FIG. 6 is a diagram showing the state in which pixels are divided into blocks each of which is made of three pixels in the horizontal direction in the color CCD solid-state image sensing apparatus shown in FIG. 4.

As to the color filter, three colors of green, red and blue are arranged as shown in FIG. 5.

In other words, filters of green G are arranged in a checkered pattern and filters of red R and blue B are arranged in the remaining part at intervals of one row and one column.

In correspondence to these color filters, respective pixels are represented by colors R, G and B of the color filters together with a suffix of the row and column numbers as G11, R12, G13, etc. shown partially in FIG. 4.

Next, modes of operation in the CCD solid-state image pickup apparatus according to the present embodiment will be described in sequence.

1. Operation of Adding in the Horizontal Direction

In this mode of operation, three pixels in the horizontal direction of the two-dimensional color CCD image pickup apparatus 1 shown in FIG. 4 are made one block.

As described below, signal charges of two pixels except the middle of each block are added together inside an image pickup device in order to reduce the number of samples of signal charge in the horizontal direction to half of the number of pixels in the horizontal direction.

FIG. 6 shows such a state that three pixels in the horizontal direction are gathered to each block.

Additionally, in FIG. 6, charges of the photodiodes of circled pixels represent charges that are to be added and used as signals, whereas charges of the photodiodes of shaded pixels represent charges that are to be added but not used as signals.

First of all, signal charges of two pixels except the middle of each block are added inside the image pickup device and a signal charge of the one middle pixel is added to a signal charge of one middle pixel in the adjacent block.

This way makes it possible to change signal charges of pixels G11, R12, G13, R14, G15, R16 corresponding to the first row in FIG. 6 into signals of combinations of G11+G13, R14+R16, R12+G15 and to store the same in the horizontal CCD register 7.

Subsequently, in the same manner, it will be possible to add signals B21, G22, B23, G24, B25, G26 corresponding to the second row in the color filter arrangement of FIG. 6 and to obtain signals of combinations of B21+B23, G24+G26, G22+B25.

In this case, after the signal charges corresponding to the first row pixels have been stored in the horizontal register 7, the signal charges corresponding to the second row pixels can be stored in any empty packets of the horizontal CCD register 7.

Therefore, all the signals for two rows of the first row and the second row can be output from the horizontal CCD register 7 to drive the horizontal CCD register 7 by one horizontal scanning amount.

Then, out of six signals G11+G13, R14+R16, R12+G15, B21+B23, G24+G26, G22+B25 which are the signals for two rows output from the horizontal CCD register 7, signals of mixed color R12+G22 and G15+B25 are not used and the four remaining signals G11+G13, R14+R16, B21+B23, G24+G26 are used in a signal processor section, thereby allowing the number of samples to be reduced without causing a mixture of different colors.

Figures 2, 3:
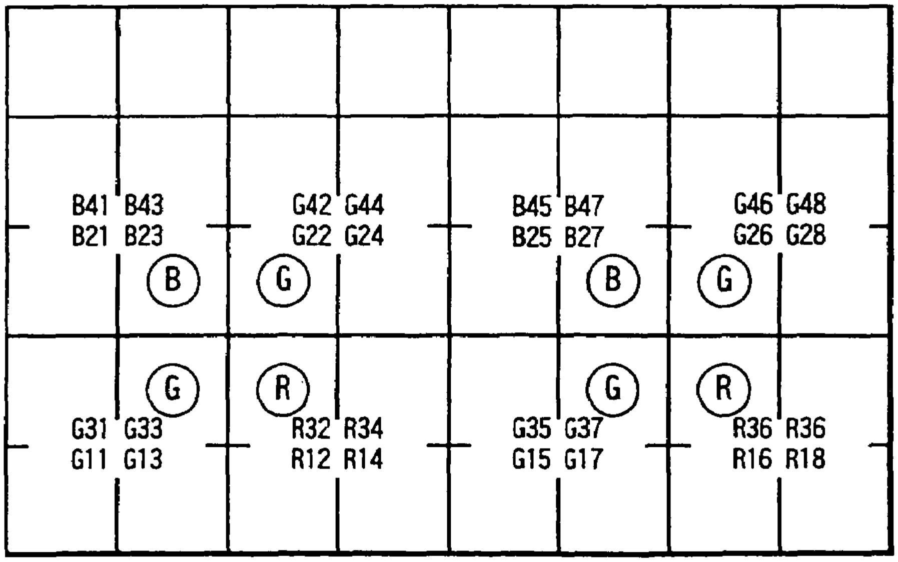
FIG. 2 is a diagram showing the color arrangement of color filters.
FIG. 3 is a conceptional diagram of the signal transfer in the solid-state image pickup apparatus for obtaining signals that signal charges two pixels apart in the horizontal and vertical directions are added within the vertical transfer registers.
Figure 7:
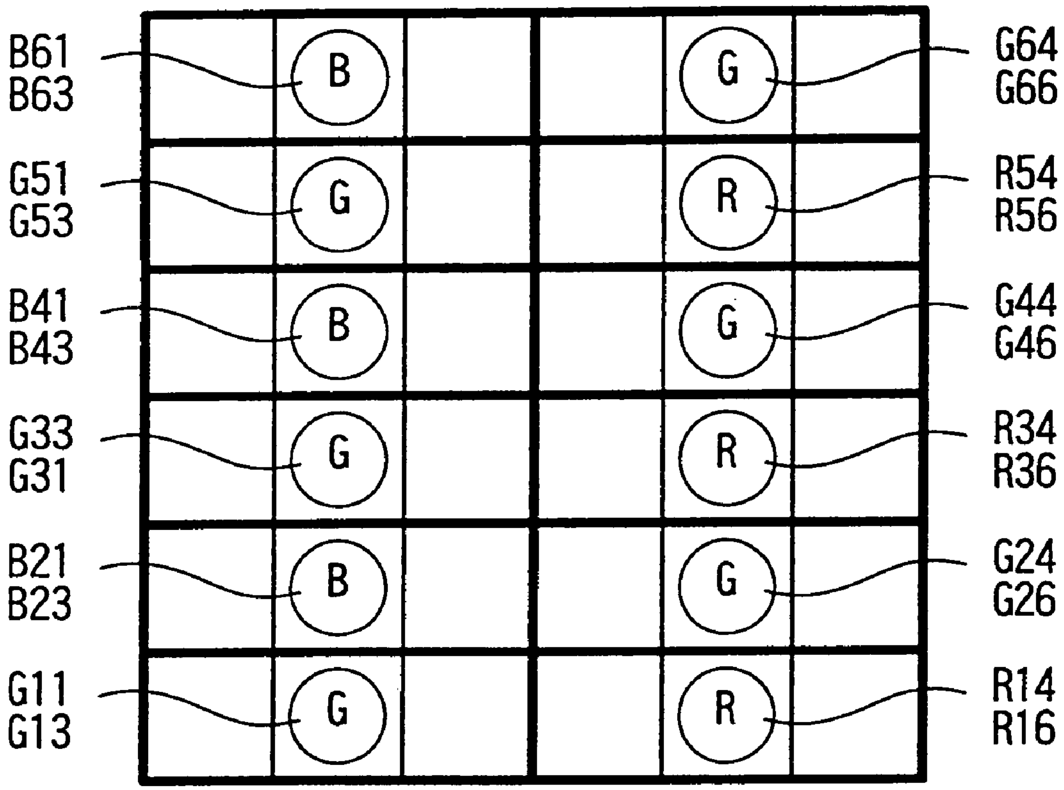
FIG. 7 is a diagram showing positions of the weight center of added signals in the adding operation in the horizontal direction.

In this case, as is shown in FIG. 7, circled positions of the weight center of the added signals are distributed in a three pixel cycle in the horizontal direction. Symbols shown outside the circles denote the coordinate positions of the added components in FIG. 2.

This applies to blocks, not shown, corresponding to and after the seventh column as well.

Consequently, by processing signals in this way, it will be possible to make uniform spacial intervals between sample points in the horizontal direction.

Moreover, in this case, the number of samples fall to one sample relative to three pixels in one block, i.e. one third of the number of pixels. If a driving frequency of the horizontal CCD register is constant, then the frame rate will become two times as compared with that of normal operation.

Furthermore, positions of three colors R, G, B in FIG. 7 are G, R, G, etc. in the first row and B, G, B, etc. in the second row, thus having,the almost same positional relationship as the color arrangement of color filters shown in FIG. 5.

By carrying out the aforesaid operation, the number of samples can be reduced, and because of the uniform spacial intervals between sample points in the horizontal direction and the almost same positional relationship as the color arrangement of color filters as described above, it will be possible to use the same algorithm for processing signals as that used in the conventional operation without adding. This will enable the signal processing to be simplified without causing the color mixture.

Further, the description on the above operation has been made with respect to color filters of Bayer's arrangement having the 2×2 repeating cycle shown in FIG. 5, but it applies to all color filters which are arranged in a two pixel cycle repeating in the horizontal direction.

Next, a specific structure and operation for implementing the aforesaid adding process in the horizontal direction will be described.

Figure 8:
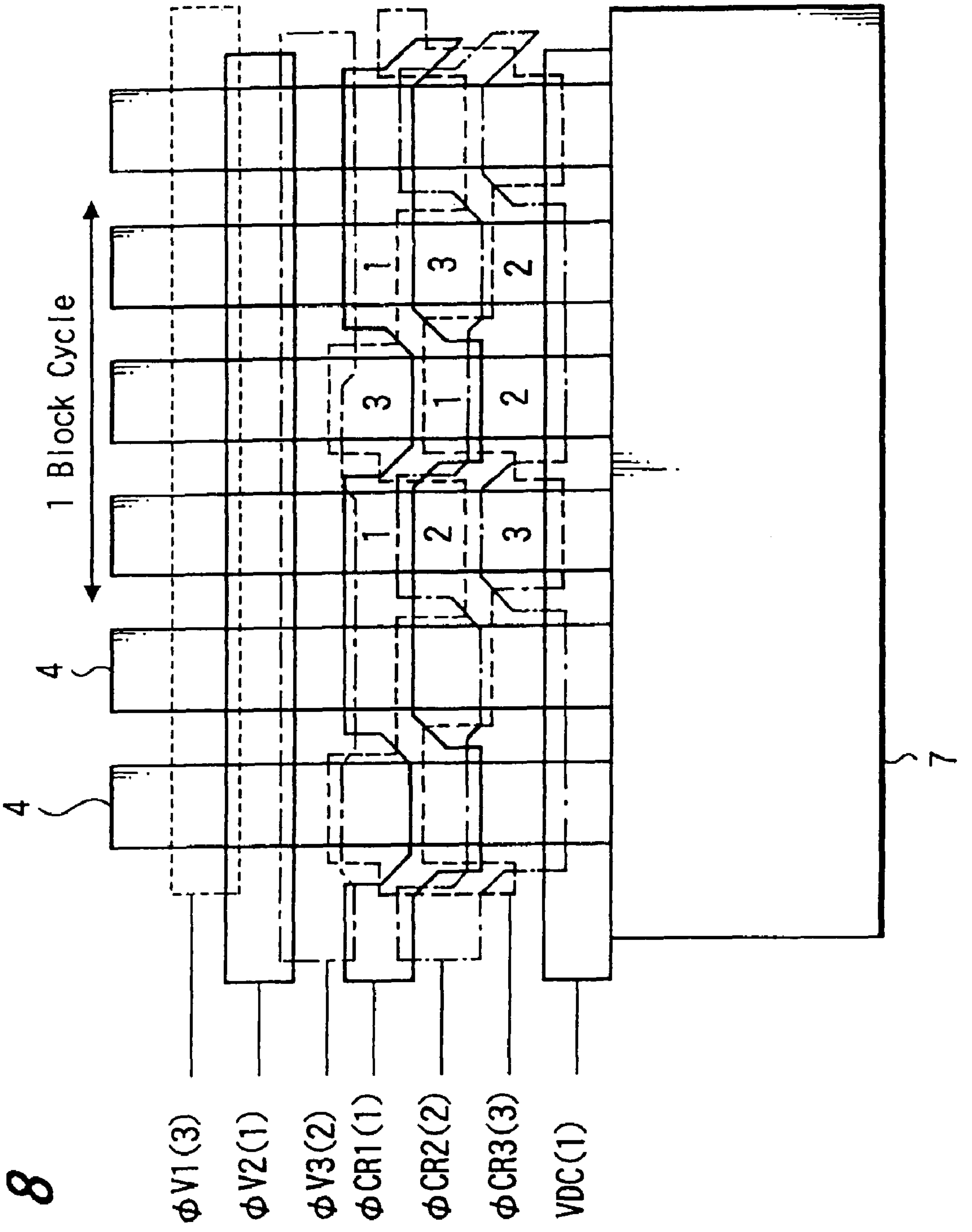
FIG. 8 is a plan view showing the electrode arrangement of vertical CCD registers and a control register section for adding in the horizontal direction.

FIG. 8 shows a specific arrangement of gate electrodes forming partial transfer electrodes of the control register section 6 and the vertical CCD registers 4, out of the entire view of the color CCD solid-state image pickup apparatus 1 shown in FIG. 4.

Figure 9:
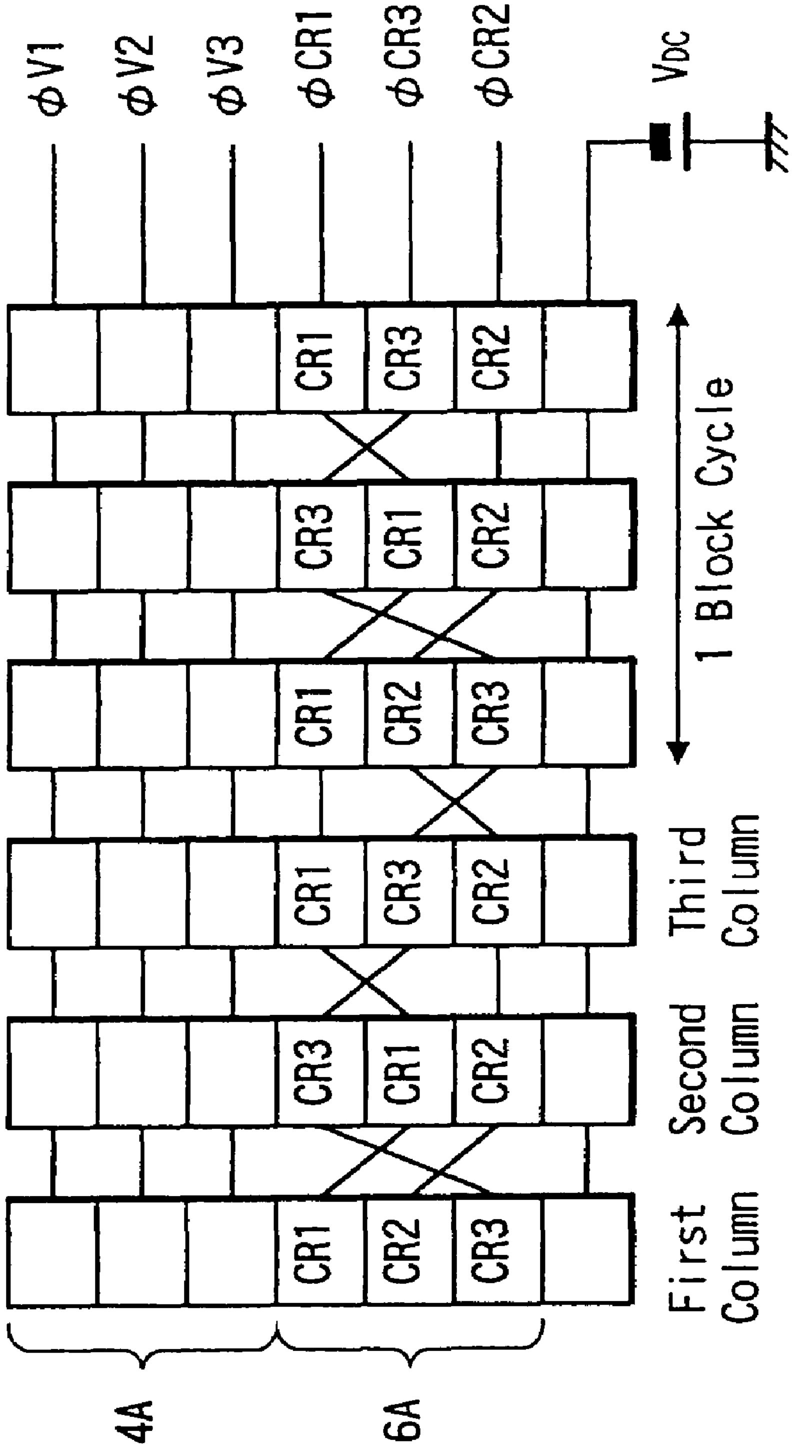
FIG. 9 is a simplified plan view of the electrode arrangement in FIG. 8.

FIG. 9 simplifies FIG. 8 to clarify a connecting relation between the gate electrodes forming the respective transfer electrodes.

The control register section 6, i.e. a part of the vertical CCD registers 4 on the side of the horizontal CCD register 7 is provided with three transfer electrodes CR1, CR2, CR3 per one column of the vertical CCD registers 4.

These three transfer electrodes CR1, CR2, CR3 are formed of one gate electrode layer of three different gate electrode layers (a first layer, a second layer, a third layer), respectively.

The three transfer electrodes CR1, CR2, CR3 are arranged in a cycle of three columns of the vertical CCD registers 4 corresponding to one block described above.

Also, as is shown in FIG. 9, transfer electrodes adjacent to the horizontal CCD register 7 of the three transfer electrodes are formed of two gate electrode layers CR2, CR3 of the three different layers, whereas transfer electrodes on the opposite side to the horizontal CCD register 7 are formed of two gate electrode layers CR1, CR3 including the gate electrode CR1 of a layer which is not used for the transfer electrodes adjacent to the horizontal CCD register 7 of the three different layers.

In this embodiment, a channel corresponding to each of the transfer electrodes CR1, CR2, CR33 in an electrode group 6A of the control register section 6 is comprised of a storage part including respective storage electrodes CR1*s*, CR2*s*, CR3*s* and a barrier part including respective transfer electrodes CR1*t*, CR2*t*, CR3*t* (see FIG. 11 to FIG. 13), thus allowing an independent charge packet to be formed in each of the transfer electrodes CR1, CR2, CR3.

Suffixes (1), (2), (3) in FIG. 8 indicate that respective gate electrode layers are gate electrode layers of the first layer, the second layer and the third layer, respectively. Vertical order of the first layer, the second layer and the third layer of gate electrode layers is optional and so they need only to be gate electrode layers different from one another.

Arranging the gate electrode layers in this manner brings the following advantage.

First, transfer electrodes adjacent to the vertical CCD registers 4 in the control register section 6 can be formed by two sorts of gate electrode layers (the first layer and the third layer).

Likewise, transfer electrodes in the control register section 6 and closest to the horizontal CCD register 7 can also be formed by two sorts of gate electrode layers (the second layer and the third layer).

This makes it possible to use the remaining gate electrode layer for respective transfer electrodes adjacent to the control register section 6, of the vertical CCD registers 4 and the horizontal CCD register 7 (in case of FIG. 8, the second gate electrode layer for the vertical CCD registers 4, the first gate electrode layer for the horizontal CCD register 7, respectively), thereby enabling the gate electrode layers used for the vertical CCD registers 4, the control register section 6 and the horizontal CCD register 7 to be formed by a total of only three sorts thereof.

Suppose that the transfer electrodes adjacent to the vertical CCD registers 4 and the transfer electrodes closest to the horizontal CCD register 7 in the control register section 6 were formed from the three sorts of gate electrode layers (the first layer, the second layer and the third layer), it would be necessary to use another gate electrode layer (the fourth layer) in addition to the transfer electrodes of the vertical CCD registers 4 adjacent to the control register section 6 and those of the horizontal CCD register 7. Thus, the gate electrode layers used for the vertical CCD registers 4, the control register section 6 and the horizontal CCD resister 7 would reach a total of four sorts or more.

To respective transfer electrodes V1, V2, V3 of the vertical CCD register 4 are impressed with respective driving pulses ØV1, ØV2, ØV3, and to the respective transfer electrodes CR1, CR2, CR3 of the control register section 6 are impressed with respective driving pulses ØCR1, ØCR2, ØCR3.

Between the control register section 6 and the horizontal CCD register 7 there is an electrode to which a fixed voltage VDC ( or a pulsed voltage may be used instead of the fixed voltage) is supplied and which is formed by the first gate electrode layer, so that the charge can be stored in the storage electrode (storage part) in the final row of the control register section 6, thus making it possible for the control register section 6 to control its transfer to the horizontal CCD register 7.

Next, an operation of the aforesaid color CCD solid-state image pickup apparatus 1 will be described.

Figure 10:
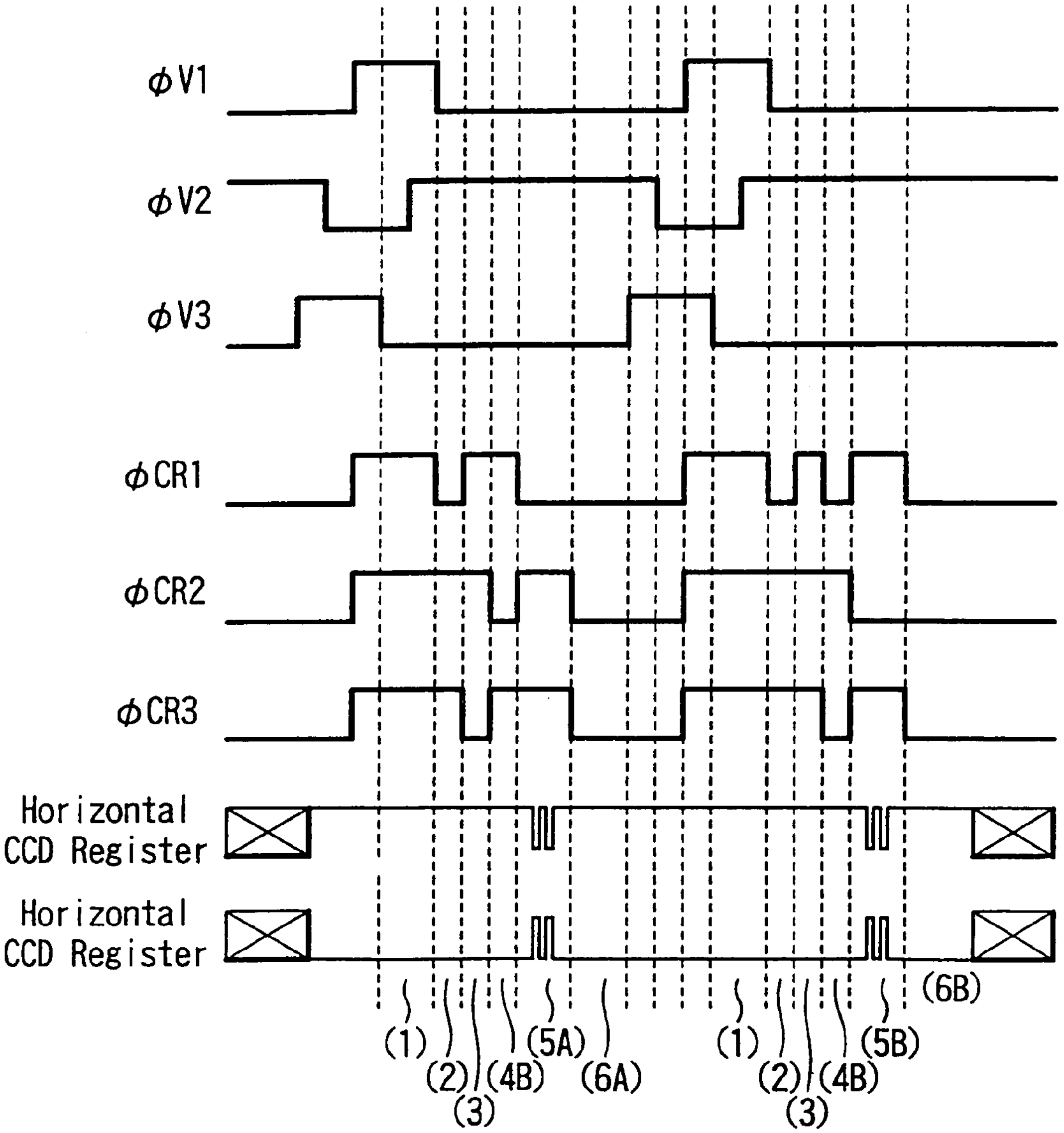
FIG. 10 is a time chart of the driving pulses for respective transfer electrodes when adding in the horizontal direction is performed.

FIG. 10 shows a time chart of the driving pulses ØV1, ØV2, ØV3, ØCR1, ØCR2, ØCR3 which are impressed to respective transfer electrode as well as driving pulses to the horizontal CCD register 7.

In addition, as to the timing of driving pulses, there area many other variations depending on how to combine the driving pulses to the vertical CCD register 4 with the driving pulses to the control register section 6.

Moreover, FIG. 11 to FIG. 13 show the basic control of charge transfer in the control register section 6 using potential diagrams, in which a circle mark represents a charge and numerals in the circle indicate row and column numbers.

These FIGS. 11 to 13 show potentials of one block from the first column to the third column in FIG. 10. Each of the transfer electrodes CR1, CR2, CR3 in the control register section 6 has the storage part (CR1*s*, CR2*s*, CR3*s*) and the barrier part (CR1*t*, CR2*t*, CR3*t*). The numbers 1 to 3 shown in Figures correspond to ØCR1 to ØCR3 in FIG. 10.

Also, times indicated by (1), (2), (3), etc. in FIG. 10 correspond to (1), (2), (3), etc. attached to respective potential diagrams of FIG. 11 to FIG. 13.

Figure 11A:
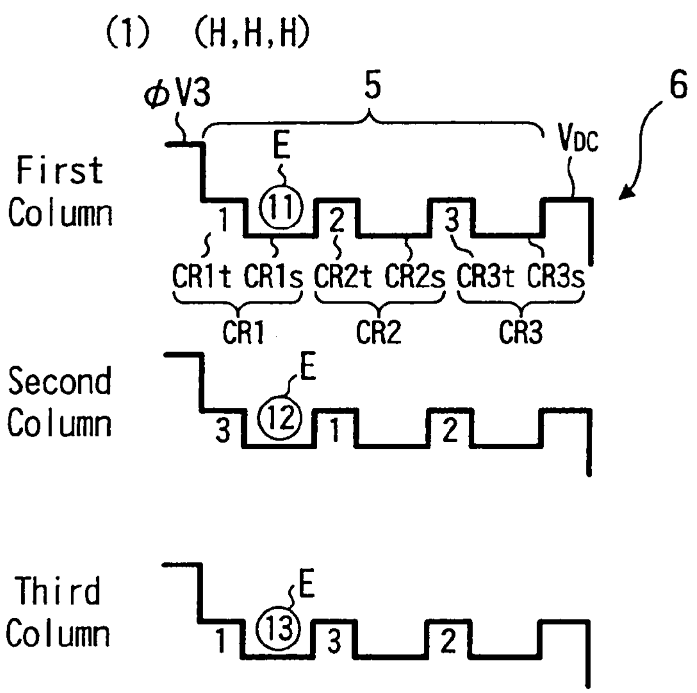
FIGS. 11A to 11C are potential diagrams showing the transfer control of charges in the control register section.

To begin with, at a time (1), the transfer electrodes CR1, CR2, CR3 in the control register section 6 are all in a high level state, when, as shown in FIG. 11A, a signal charge is transferred from the vertical CCD registers 4 to the first row of transfer electrodes in the control register section 6.

Additionally, in FIG. 11 to FIG. 13, whether a potential of each transfer electrode is in a high level state H or in a low level state L is shown, e.g. as (ØCR1, ØCR2, ØCR3)=(H, H, H).

Figure 11B:
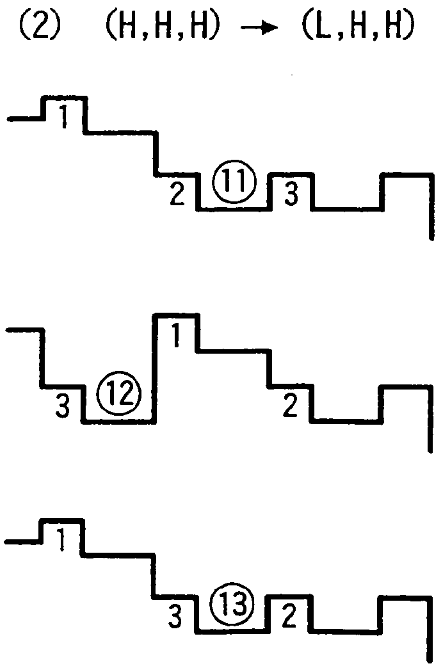

Thereafter, at a time (2), ØCR1 is turned to the low level L for changing the potentials from (H, H, H) to (L, H, H), thereby causing signal charges in the first column and the third column to be transferred to the second row in the control register section 6, as shown in FIG. 11B. The signal charge in the second column remains as it is.

Figure 11C:
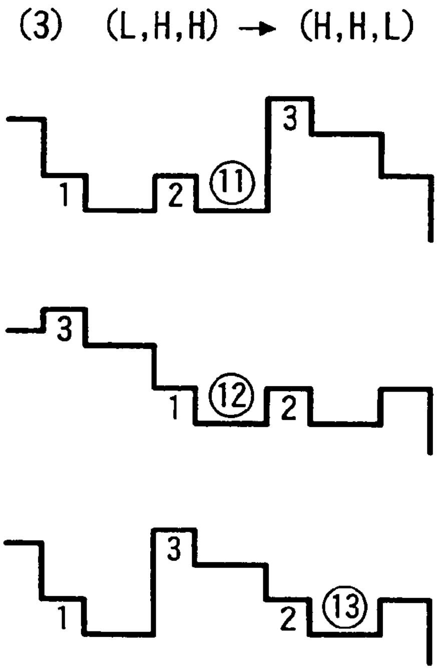

Further, at a time (3), ØCR1 is returned to the high level H and ØCR3 is turned to the low level L for changing the potentials from (L, H, H) to (H, H, L), thereby causing signal charges in the second column and the third column to be transferred to the next row in the control register section 6, as shown in FIG. 11C. As a result, the signal charges in the first column and the second column are now in the second row and the signal charge in the third column is in the third row.

In the present embodiment, there are two modes of operation after the operations for these times (1) to (3).

The first mode of operation is such that a state at a time (6A) is reached from the state of (3) via states of (4A) and (5A).

Figure 12D:
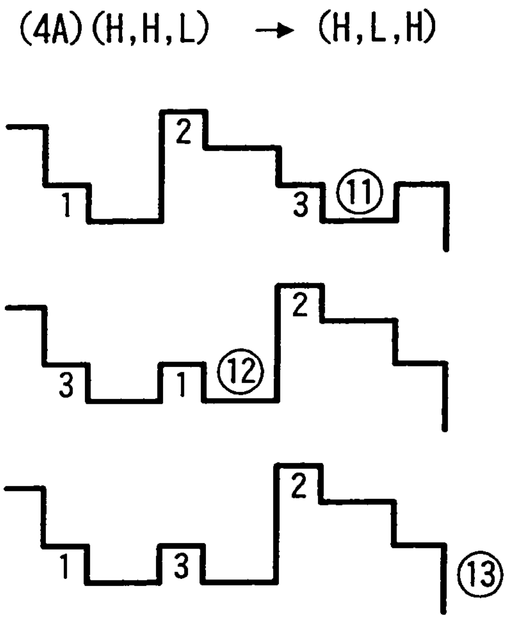
FIGS. 12D to 12F are potential diagrams showing the transfer control of charges in the control register section.

At the time (4A), ØCR3 is returned to the high level H and ØCR2 is turned to the low level L for changing the potentials from (H, H, L) to (H, L, H), thereby causing the signal charge in the third column to be transferred to the horizontal CCD register 7, as shown in FIG. 12D.

Figure 12E:
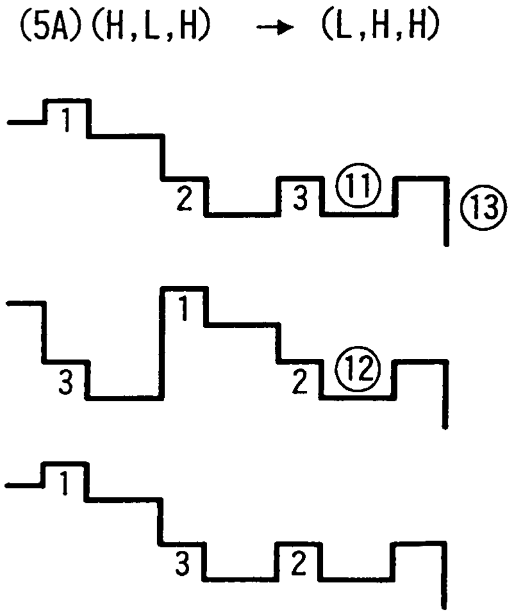

At the next time (5A), ØCR2 is returned to the high level H and the ØCR1 is turned to the low level L for changing the potentials from (H, L, H) to (L, H, H), thereby causing the signal charge in the second column to be transferred from the second row to the third row of the control register section 6, as shown in FIG. 12E.

Moreover, as is shown in FIG. 10, at this time (5A), the driving pulse is impressed twice to the horizontal CCD register 7 for transferring the signal charge in the third column to the first column.

Specifically, in the state of this time (5A), only the signal charge in the third column is transferred to the horizontal CCD register 7 and the signal charges in the first column and the second column remain in the control register section 6. In this state, if gates (CR2, CR3) denoted by the symbols 2 and 3 are turned to the low level L, then the signal charges in the first column and the second column will also be transferred to the horizontal CCD register 7.

Figure 12F:
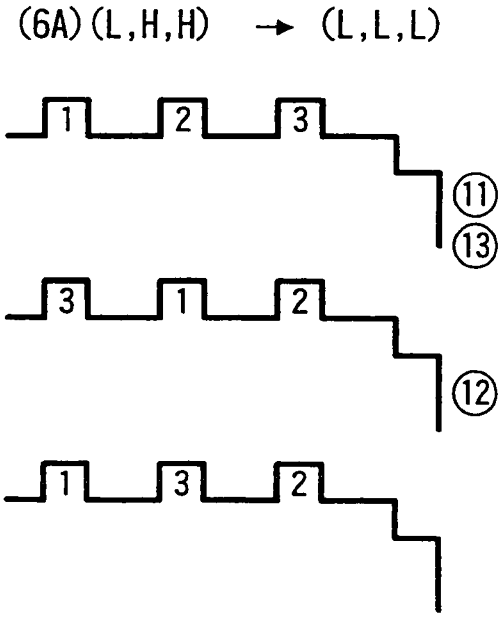

Then, at the time (6A), the potentials of all transfer electrodes are turned to the low level L for changing it from (L, H, H) to (L, L, L), thereby causing the signal charges in the first column and the second column to be transferred to the horizontal CCD register 7 as shown in FIG. 12F. On this occasion, the signal charge in the first column and the signal charge in the third column are added together.

As is shown in FIG. 10, after the state at the time (3), via the states (4A), (5A), (6A) in this first mode of operation, the vertical transfer in the vertical CCD register 4 takes place and thereafter the states at times (1) to (3) will be repeated again for transferring the signal charge in the second row to the control register section 6.

Then, after the states at times (1) to (3) for the second time, the second mode of operation will start.

The second mode of operation is such that a state at a time (6B) is reached from the state of (3) via states of (4B), (5B-1), (5B-2) (see FIGS. 13G to 13J).

Figure 13G:
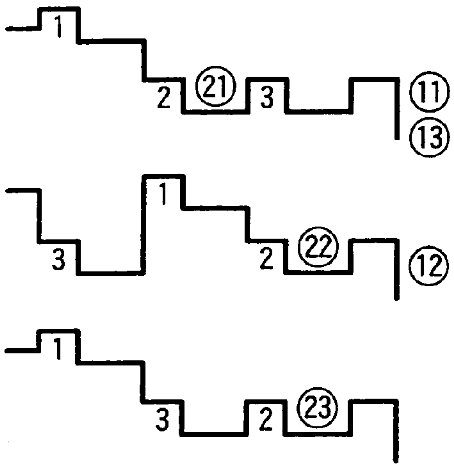
FIGS. 13G to 13J are potential diagrams showing the transfer control of charges in the control register section.

At a time (4B), ØCR3 is returned to the high level H and ØCR1 is turned to the low level L for changing the potentials from (H, H, L) to (L, H, H), thereby causing the signal charge in the second column to be transferred from the second row to the third row in the control register section 6, as shown in FIG. 13G.

At the next time (5B), in the first stage (5B-1), ØCR1 is returned to the high level H and ØCR2 is turned to the low level L for changing the potentials from (L, H, H) to (H, L, H). This causes the signal charge in the second column and the signal charge in the third column to be transferred to the horizontal CCD register 7, as shown in FIG. 10H. On this occasion, the signal charge in the second row of the second column is added to the signal charge in the first row of the second column, which has already been transferred to the horizontal CCD register 7.

Figure 13I:
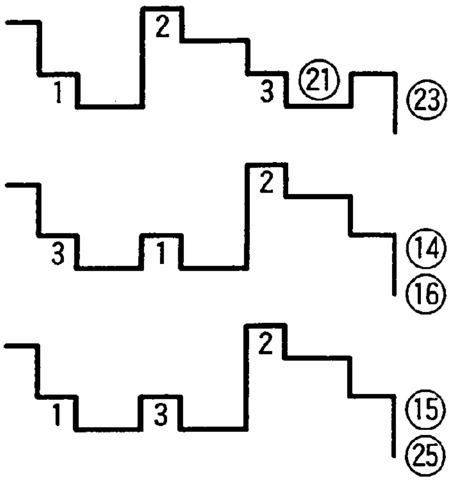

Subsequently, in the second stage (5B-2), the driving pulse to the horizontal CCD register 7 is impressed twice (see FIG. 10) to transfer the signal charge in the third column to the first column, as shown in FIG. 13I.

Specifically, in the state of this time (5B-2), the signal charges in the second column and the third column are transferred to the horizontal CCD register 7 and only the signal charge in the first column remains in the control register section 6. If the gate denoted by the symbol 3 (CR3) is turned to the low level L in this state, then the signal charge in the first column will also be transferred to the horizontal CCD register 7.

Figure 13H:
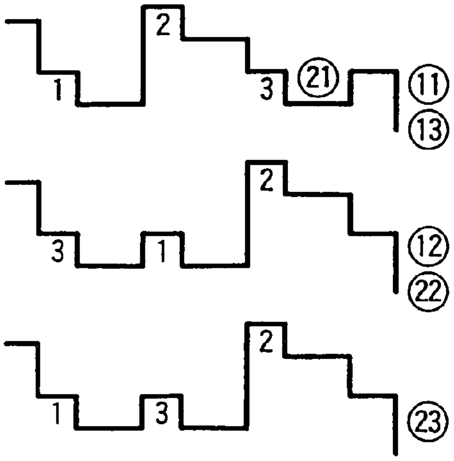
Figure 13J:
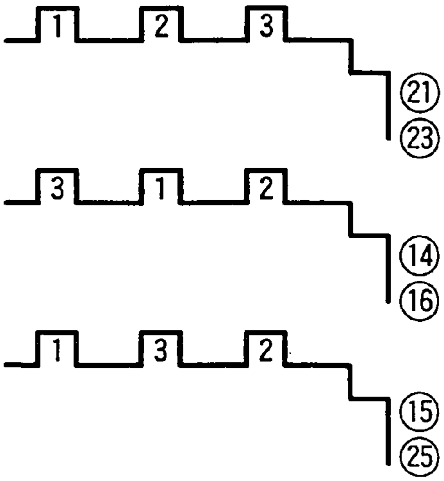

Then, at the time (6B), the potentials of all transfer electrodes are turned to the low level L for changing it from (H, L, H) to (L, L, L), thereby causing the signal charge in the first column to be transferred to the horizontal CCD register 7, as shown in FIG. 13J. On this occasion, the signal charge in the first column and the signal charge in the third column are added together.

In other words, the first mode of operation is such that a signal charge in one of the three columns, e.g. in the third column is transferred to the horizontal CCD register 7, and after this signal charge has been transferred horizontally by amount of two columns, signal charges in the two remaining columns, e.g. in the first column and the second column are transferred to the horizontal CCD register 7.

On the other hand, the second mode of operation is such that signal charges in two of the three columns, e.g. in the second column and the third column are transferred to the horizontal CCD register 7, and after the signal charges have been transferred horizontally by two columns, a signal charge in the one remaining column, e.g. in the first column is transferred to the horizontal CCD register 7.

The foregoing process are the basic operation of the control register section 6.

On the basis of the above described basic operation, the charge adding operation in the horizontal direction will be described with reference to FIG. 14 to FIG. 15.

In these Figures, the charge packet is represented by an ellipsoid and symbols R, G, B denote electric charges which have been transferred from the photodiodes of pixels corresponding to the color filters of red, green, blue, respectively.

Suffixes of R, G, B, for example, x of Rxy denotes the row number of a pixel and y denotes the column number of the pixel.

However, concerning y, when the addition in the vertical direction has been performed, y=1 indicates a synthesized result of the first row and the second row. Moreover, a signal charge which is output from the image pickup apparatus but not utilized is surrounded by a rectangle.

Figure 14A:
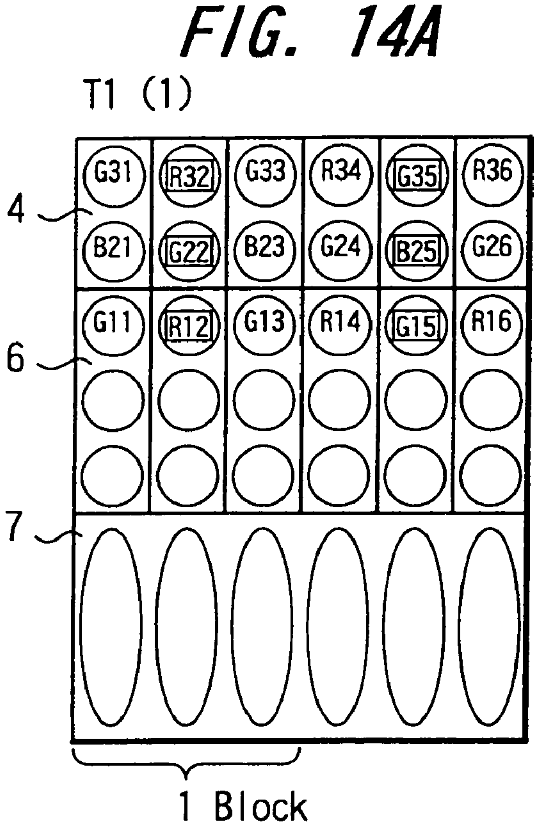
FIGS. 14A to 14D are diagrams showing the transfer state of signal charges in the adding operation in the horizontal direction.

FIG. 14A shows a state T1 immediately after a signal charge has been transferred from the vertical CCD registers 4 to the control register section 6, which corresponds to the time (1) shown in FIG. 10 and in FIG. 11A.

From this state T1, the state at the time (4A) shown in FIG. 12D can be entered as described above.

Figure 14B:
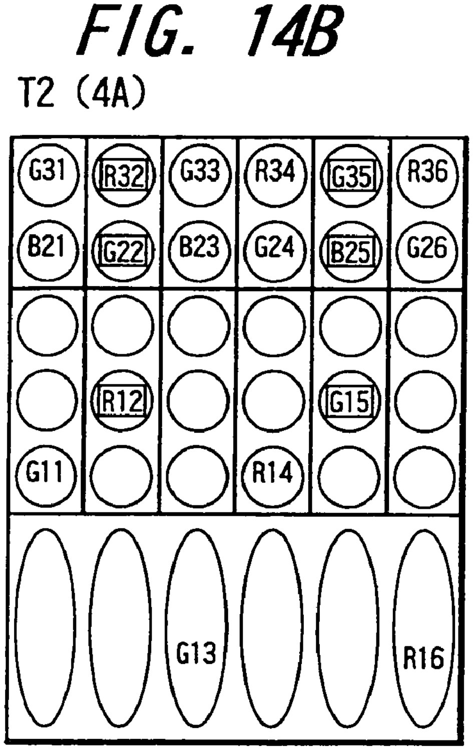

What corresponds to the state at the time (4A) is a state T2 shown in FIG. 14B. In this state T2, only the electric charge in the third column within one block is transferred to the horizontal CCD register 7, and signal charges in the first column and the second column are left in the control register section 6.

Figure 14C:
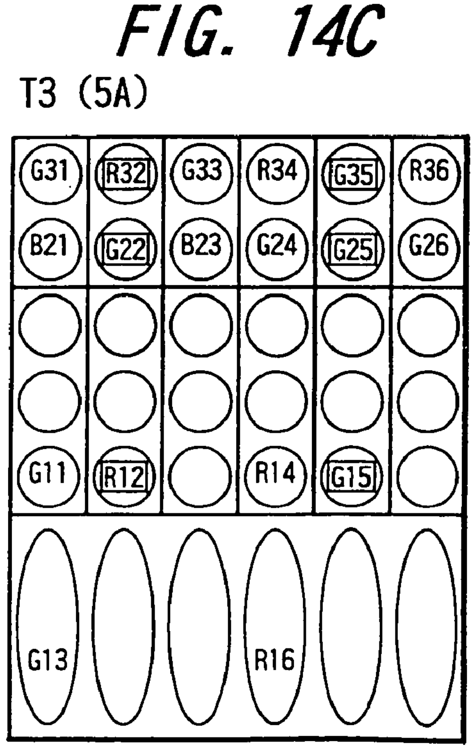

A state T3 in which the horizontal CCD register 7 is driven twice to transfer from the state T2 shown in FIG. 14B is shown in FIG. 14C. The state T3 in FIG. 14C corresponds to the state at the time (5A) shown in FIG. 12E.

The signal charge in the second column is transferred to the last row in the control register section 6 and then the signal charges in the first column and the second column enter a state waiting for being transferred to the horizontal CCD register 7. Again, the signal charge in the third column transferred to the horizontal CCD register 7 is transferred to the first column.

The same applies to the fourth column to the sixth column.

Figure 14D:
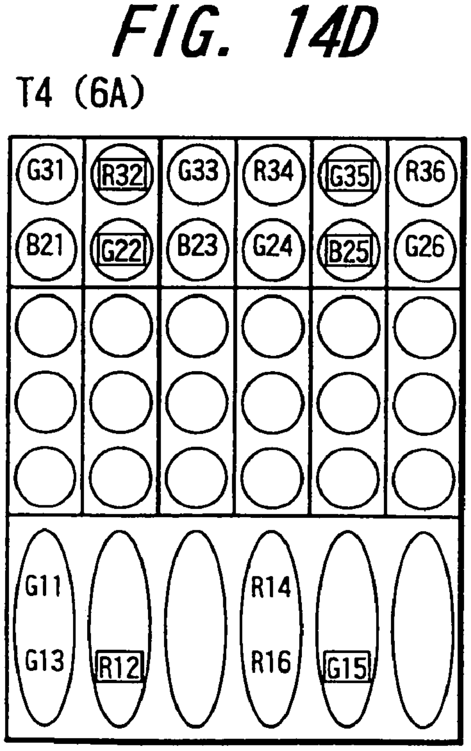

FIG. 14D shows a state T4 in which the signal charges in the first column and in the second column on standby in the control register section 6 from the state in FIG. 14C have been transferred to the horizontal CCD register 7. This state T4 shown in FIG. 11D corresponds to the state at the time (6A) shown in FIG. 12F.

In this state T4 in FIG. 14D, signal charges G11, R14, etc. in the first column within each block and signal charges G13, R16, etc. in the third column are added together inside the horizontal CCD register 7.

In this case, since the color filters are repeated in a two pixel cycle in the horizontal direction, signal charges of the same color are added to each other without fail.

Figure 15E:
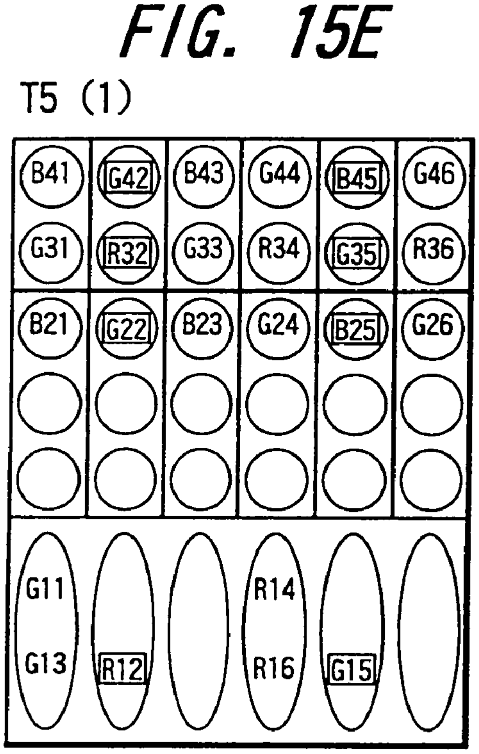
FIGS. 15E to 15H are diagrams showing the transfer state of signal charges in the adding operation in the horizontal direction.

FIG. 15E shows a state T5 immediately after, due to the signal charge transfer by the vertical CCD register 4, signal charges B21, G22, B23, etc. in the second row are transferred to the control register section 6 from the state in FIG. 14D. This state T5 shown in FIG. 15E corresponds to the state at the time (1) for the second time in the time chart of FIG. 10.

It has previously been described that the transition from the state at the time (1) in FIG. 10 to the state at the time (5B) in FIG. 10, i.e. the state at the time (5B-1) in FIG. 13H and the state at the time (5B-2) in FIG. 13I is possible.

Figure 15F:
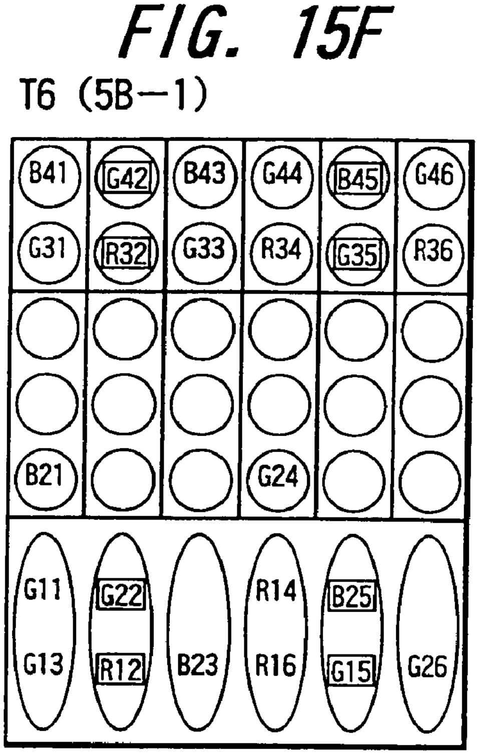

What corresponds to the state at the time (5B-1) shown in FIG. 13H of such states is a state T6 shown in FIG. 15F.

In this state T6 shown in FIG. 15F, signal charges G22, B25, etc. in the second column and signal charges B23, G26, etc. in the third column in the control register section 6 are transferred to the horizontal CCD register 7, whereas only the signal charges B21, G24, etc. in the first column are left standby in the control register section 6.

On this occasion, signal charges R12, G15, etc. in the first row of the second column which have already been transferred to the horizontal CCD register 7 and signal charges G22, B25, etc. in the second row of the second column which have newly been transferred to the horizontal CCD register 7 are added to each other in different colors. However, because these are signals which are surrounded by a rectangle and not to be utilized, no problem will be raised even if such different colors are mixed with each other.

Figure 15G:
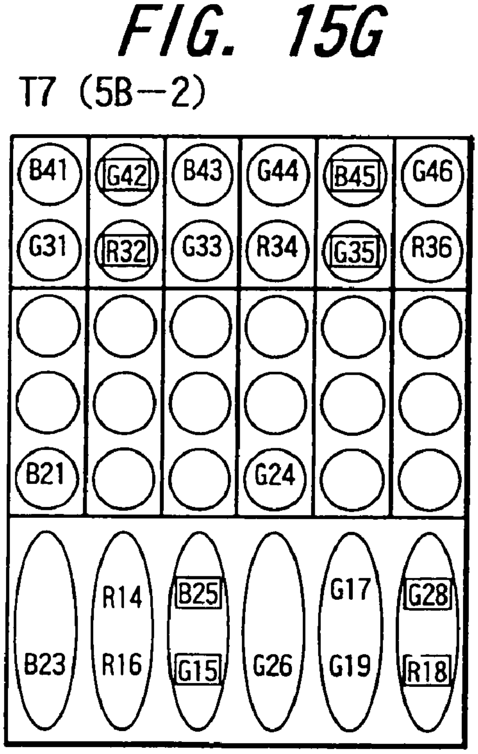

A state T7 in which the horizontal CCD register 7 is driven twice to transfer from the state T6 shown in FIG. 15F is shown in FIG. 15G. This state T7 in FIG. 12G corresponds to the state at the time (5B-2) shown in FIG. 13I.

Due to this operation, signal charges B23, G26, etc. in the third column which are not yet added to signal charges in the first column of the second row are transferred to the first column.

Figure 15H:
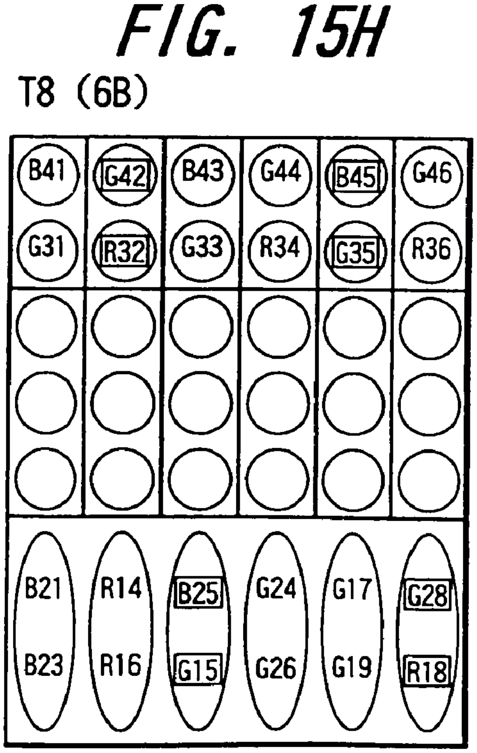

FIG. 15H shows a state T8 in which signal charges B21, G24, etc. in the second row of the first column on standby in the control register section 6 are transferred from the state T7 in FIG. 15G to the horizontal CCD register 7. This state T8 in FIG. 15H corresponds to the state at the time (6B) shown in FIG. 13J.

In this state T8, signal charges B21, G24, etc. in the first column and signal charges B23, G26, etc. in the third column within each block are added together inside the horizontal CCD register 7. On this occasion, because the color filters are repeated in a two pixel cycle in the horizontal direction, signal charges of the same color are added to each other without fail.

The desired operation have been obtained in the foregoing way. In consequence, as shown in FIG. 7, signals having the weight center made by the center of each block can be derived and further, because they have the same color arrangement as the original arrangement of color filters, the same algorithm as that for processing signals in the normal operation can be employed.

For supplement, instead of transferring from the state T2 in FIG. 15B by the horizontal CCD register 7, after all signal charges waiting in the control register section 6 (in FIG. 14B, signal charges in the first column and the second column within each block) have been transferred to the horizontal CCD register 7, the transfer by the horizontal CCD register 7 may be performed, which enables also signal charges in each row to be output from the CCD solid-state image pickup device without being mixed with each other.

Therefore, it is possible to switch timely between the operation to output signal charges without mixing each pixel and the above described operation to add signal charges.

According to the aforesaid embodiment, because the color filters are arranged in a two pixel cycle in the horizontal direction and signals are processed by dividing pixels into blocks each of which is made of three pixels in the horizontal direction, thus causing pixels at both ends of each block to be always of the same color, different colors will not be mixed even if they are mixed and therefore, it will be possible to reduce the number of samples to one third by adding and mixing signal charges which are two pixels apart in the horizontal direction within each block.

2. Operation of Adding in the Horizontal and Vertical Directions

Next, as another embodiment of operations by the color CCD solid-state image pickup apparatus 1 in FIG. 4, a case where signal charges are added in both the horizontal direction and the vertical direction with the color CCD solid-state image pickup apparatus 1 in FIG. 4 will be illustrated as follows.

According to the present embodiment of operation, a total of nine pixels including three pixels in the horizontal direction and three pixels in the vertical direction of the two-dimensional color CCD image pickup apparatus 1 in FIG. 4 is defined as one block.

Then, as described below, signal charges at four corners of each block are added together inside the image pickup device and the number of samples of signal charges in the vertical direction are reduced to one third of the number of pixels in the vertical direction.

Figure 16:
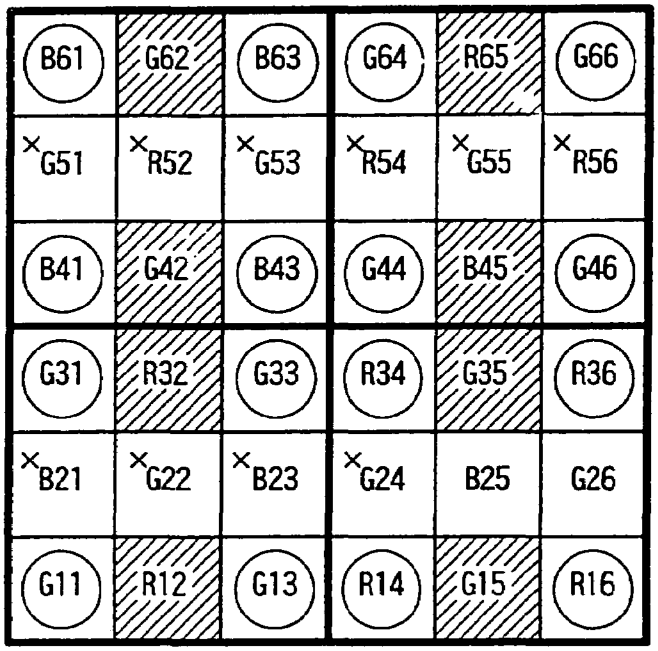
FIG. 16 is a diagram showing the state in which pixels are divided into blocks each of which is made of nine pixels in total including three pixels in the horizontal direction and three pixels in the vertical direction in the color CCD solid-state image pickup apparatus in FIG. 4.

FIG. 16 shows a state in which a total of nine pixels including respective three pixels in the horizontal direction and the vertical direction constitute each individual block.

Further, in FIG. 16, an electric charge of the photodiode of a circled pixel represents one which is to be added and used as a signal, while an electric charge of the photodiode of a shaded pixel represents one which is to be added but not used as a signal.

In addition, an electric charge of the photodiode of a crossed pixel represents one which is not transferred from the photodiode to the vertical CCD register, but is discharged from the photodiode into a drain.

First of all, signal charges of six pixels except three pixels in the middle row of each block are transferred from the photodiodes 2 to the vertical CCD registers 4 (read-out).

In FIG. 16, regarding blocks corresponding to pixels in the first row to the third row, from the left block including the first column to the third column signal charges G11, R12, G13 and G31, R32, G33 are transferred to the vertical CCD registers 4, and from the right block including the fourth column to the sixth column signal charges R14, G15, R16 and R34, G35, R36 are transferred to the vertical CCD registers 4.

Similarly, regarding also blocks corresponding to pixels in the fourth row to the sixth row, signal charges B41, G42, B43 and B61, G62, B63 as well as signal charges G44, B45, G46 and G64, B65, G66 are transferred to the vertical CCD registers 4.

Next, out of the signal charges of six pixels in each block which are transferred to the vertical CCD registers 4, signal charges of four pixels except two pixels in the middle column, i.e. pixels at four corners of each block are added together inside the image pickup device, and signal charges of two pixels in the middle column of the block are added inside the solid-state image pickup device to signal charges of two pixels in the middle column of the adjacent block, in the present embodiment, the vertically adjacent block.

Accordingly, for the blocks corresponding to pixels in the first column to the third column in FIG. 16, signal charges G11, R12, G13; G31, R32, G33; B41, G42, B43; and B61, G62, B63 can be turned into combinations of signals G11+G13+G31+G33, B41+B43+B61+B63 and R12+R32+G42+G62 to be stored in the horizontal CCD register 7.

Likewise, for blocks corresponding to pixels in the fourth column to the sixth column in FIG. 16, signal charges R14, G15, R16; R34, G35, R36; G44, B45, G46; and G64, B65, G66 can be turned into combinations of signals R14+R16+R34+R36, G44+G46+G64+G66 and G15+G35+B45+B65.

In this case, after signal charges corresponding to pixels in the first row to the third row in the blocks are stored in the horizontal CCD register 7, signal charges corresponding to pixels in the fourth row to the sixth row in the blocks can be stored in any empty packets of the horizontal CCD register 7.

Therefore, the signal charges of blocks in the first row to the third row and the signal charges of blocks in the fourth row to the sixth row can all be output from the horizontal CCD register 7 by driving the horizontal CCD register 7 to one horizontal scanning amount.

Then, out of signals for four blocks (including six rows and six columns) output from the horizontal CCD register 7, i.e. six signals G11+G13+G31+G33, R14+R16+R34+R36, R12+R32+G42+G62, B41+B43+B61+B63, G44+G46+G64+G66, G15+G35+B45+B65, signals of mixed color R12+R32+G42+G62 and G15+G35+B45+B65 are not employed, but the four remaining signals G11+G13+G31+G33, R14+R16+R34+R36, B41+B43+B61+B63, G44+G46+G64+G66 are employed in the signal processor section, thereby allowing the number of samples to be reduced without causing the mixture of different colors.

Figure 17:
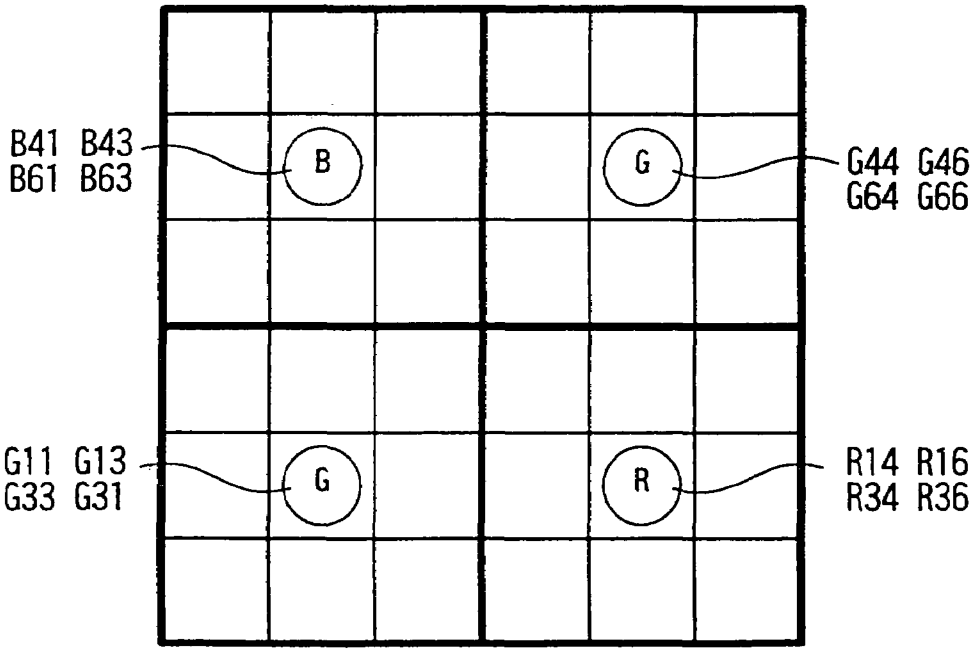
FIG. 17 is a diagram showing positions of the weight center of the added signals in the adding operation in the horizontal and vertical directions.

Moreover, in this case, as is shown in FIG. 17, circled positions of the weight center of the added signals are distributed in a three pixel cycle in both the horizontal and vertical directions. Symbols shown outside the circle indicate coordinate positions of the added components in FIG. 2.

Similarly, for blocks, not shown, corresponding to the seventh row and thereafter and the seventh column and thereafter, they are also distributed in a three pixel cycle in both the horizontal and the vertical directions.

Thus, by the above described signal processings, it will be possible to make uniform of spacial intervals between sampling points in the horizontal direction and the vertical direction.

Also, in this case, the number of samples of signal charges in the vertical direction is reduced to one sample relative to three pixels in the vertical direction of one block, i.e. to one third of the number of pixels in the vertical direction.

Furthermore, positions of three colors R, G, B in FIG. 17 are such that those in the second row are arranged in G, R, G etc. and those in the fifth row are arranged in B, G, B. etc. This means that they have the nearly same positional relationship as the color arrangement of color filters shown in FIG. 5.

The foregoing operation enables the number of samples to be reduced and the same algorithm for processing signals as that in the conventional operation involving no addition to be utilized, because of uniform spacial intervals between sampling points in the horizontal and vertical directions as well as the almost same positional relationship as the color arrangement of color filters described above. This allows the signal processings to be simplified without causing the mixture of colors.

In addition, having described the operation based on the color filters of Bayer's arrangement shown in FIG. 5 in which the 2×2 cycle is repeated, this description applies-to all the color filters having the two pixel cycle repeated in the horizontal and vertical directions.

Next, a specific structure and operations to implement the aforesaid adding process in the horizontal and vertical directions will be described.

2V. Operation of Adding in the Vertical Direction

To begin with, the adding operation in the vertical direction of adding in the horizontal and vertical directions will be described.

Figure 18:
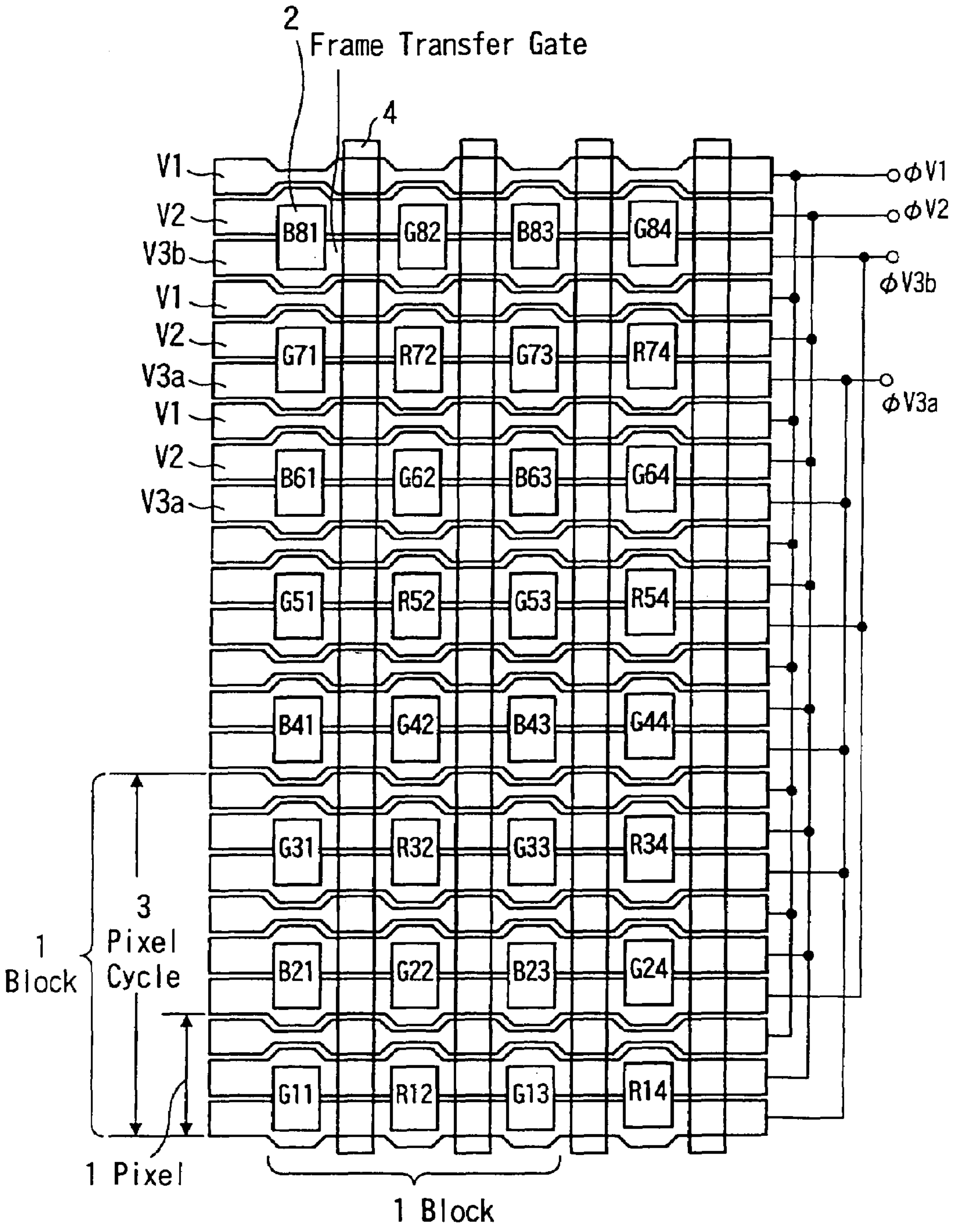
FIG. 18 is a plan view showing the structure of transfer electrodes of the vertical CCD registers for adding in the vertical direction.

FIG. 18 shows a specific arrangement of gate electrodes forming transfer electrodes of the vertical CCD registers 4, out of the entire view of the color solid-state image pickup apparatus 1 shown in FIG. 4.

In the structure of FIG. 18, each pixel comprises the photodiode 2, the vertical CCD register 4, a frame transfer gate, i.e. the readout gate for controlling the transfer between the photodiode 2 and the vertical CCD register 4, and a channel stop (not shown) for separating each pixel.

The vertical CCD register 4 is formed by a three phase CCD register having transfer electrodes V1, V2, Va, V3*b* and this vertical CCD register 4 and is driven by impressing pulses from four respective terminals ØV1, ØV2, ØV3*a*, ØV3*b* to the respective transfer electrodes V1, V2, V3*a*, V3*b*.

Further, in a normal transfer operation of the vertical CCD register 4 which is described below, the pulses to ØV3*a* and ØV3*b* may be the identical pulse.

The gate electrodes V3*a* and V3*b* to which the ØV3*a* and Ø3*b* are impressed serve here both as vertical transfer electrodes of the vertical CCD register 4 and the frame transfer gates, i.e. so-called readout gate electrodes.

In a block having the three pixel cycle shown in FIG. 18, the pulse ØV3*a* is impressed to the frame transfer gates of pixels in both endmost rows in the vertical direction of each block, and the pulse ØV3*b* is impressed to the frame transfer gates of pixels in the middle row of each block. By arranging in this manner, the following two kinds of operations will be enabled.

(1) A First Operation (Normal Operation)

The first operation is a normal operation in which signal charges stored in all the photodiodes 2 are transferred to the vertical CCD register 4 by impressing driving pulses for readout to both terminals ØV3*a* and ØV3*b*.

(2) A Second Operation (Adding Operation)

The second operation is an adding operation in which, by impressing a driving pulse for readout to only the terminal ØV3*a*, signal charges of pixels corresponding to ØV3*a*, i.e. pixels in both endmost rows of the block are transferred from the photodiode 2 to the vertical CCD register 4. However, the driving pulse is not impressed to the terminal ØV3*b* and signal charges of pixels corresponding to ØV3*b*, i.e. pixels in the middle row of the block are not transferred, thus being left stored in the photodiode 2.

The above described second operation causes signal charges G11, G31, B41, B61, etc. to be transferred to the vertical CCD register 4 with respect to the first column in FIG. 18. However, signal charges B21, G51, B81, etc. are not transferred to the vertical CCD register 4.

Figure 19:
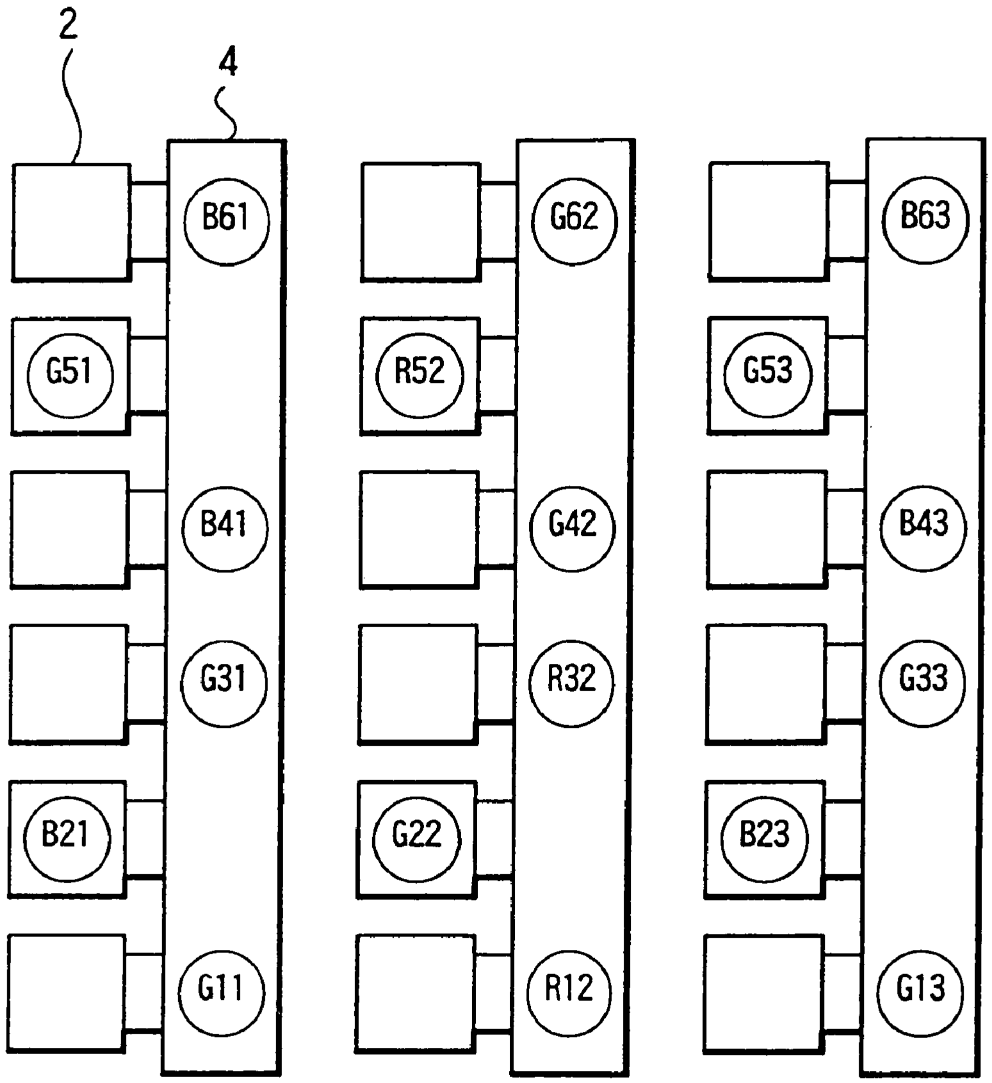
FIG. 19 is a diagram showing the state in which signal charges are read out of photodiodes to the vertical CCD registers when adding in the vertical direction is performed.

FIG. 19 shows the state of partial signal changes in the first column to the third column at this stage.

That is to say, signal charges of pixels in the middle row of each block are thinned out and signal charges of the remaining pixels are transferred.

In addition, signal charges B21, G51, B81, etc. which are not transferred to the vertical CCD register 4 are preferably processed to be discharged from the photodiode 2 to the drain (not shown) by means of an electronic shutter function of the substrate discharge type or the like.

At the stage in FIG. 19, it is easily feasible to add the signal charges in combinations of G11 and G31, B41 and B61, etc.

The addition of these signal charges may be performed immediately after the transfer from the photodiode 2 to the vertical CCD register 4 or may be performed at the stage of transferring from the vertical CCD register 4 to the horizontal CCD register 7 or may be performed at the stage of being transferred to the control register section 6.

2H Addition in the Horizontal Direction

Next, the addition in the horizontal direction will be described.

The basic structure and operation are made in the same way as those of the aforesaid embodiment for performing the operation of adding in the horizontal direction.

Specifically, for example, like the aforesaid embodiment performing the adding operation in the horizontal direction, the control register section 6 having the transfer electrodes CR1, CR2, CR3 which are made up of the three gate electrode layers is arranged between the vertical CCD registers 4 and the horizontal CCD register 7. By making this to operate, it is possible to perform the addition in the horizontal direction.

When the addition of signal charges in the vertical direction is performed by the vertical CCD registers 4, for example, from the state in FIG. 19 is performed the addition of signal charges in the vertical direction. For instance, signal charges corresponding to pixels in the first row to the third row of the block are added together in the vertical direction, so that signal charges G11+G31, R12+R32, G13+G33, R14+R34, G15+G35, R16+R36 are obtained.

Thereafter, these added signal charges are driven in the same way as in the aforesaid adding operation in the horizontal direction, thereby enabling the addition of signal charges in the horizontal direction and the transfer in the horizontal direction of signal charges to be performed, as FIG. 20 and FIG. 21 show the same states of transfer as shown in FIG. 14 and FIG. 15.

Figure 20A:
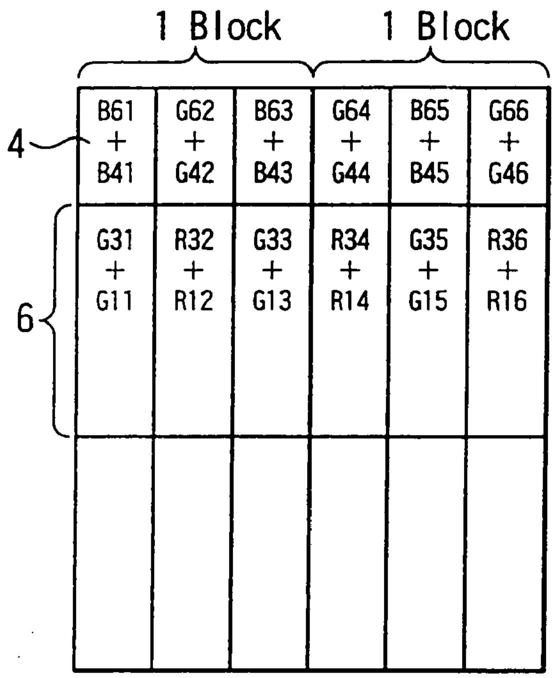
FIGS. 20A to 20D are diagrams showing the transfer state of signal charges in the adding operation in the horizontal and vertical directions.

As shown first in FIG. 20A, signal charges G11+G31, R12+R32, G13+G33, R14+R34, G15+G35, R16+R36 derived from adding signal charges corresponding to pixels in the first row to the third row of the block in the vertical direction are transferred to the control register section 6.

Figure 20B:
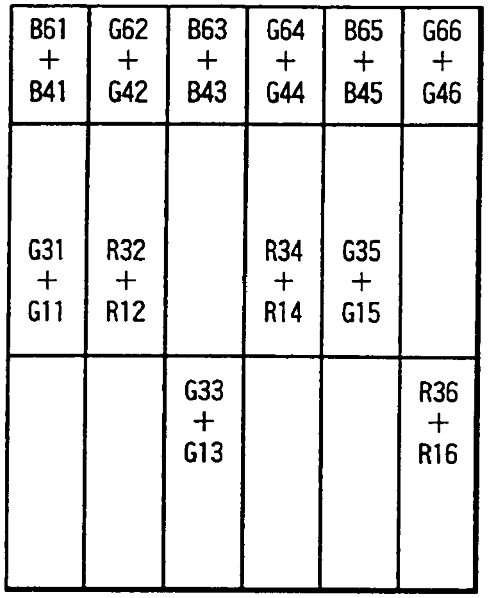

Subsequently, by performing the transfer within the control register-section 6, as shown in FIG. 20B, signal charges G13+G33, R16+R36 in one of the three columns, e.g. the third column in each block are transferred to the horizontal CCD register 7, whereas signal charges in the remaining columns, e.g. the first column and the second column are left in standby conditions.

Figure 20C:
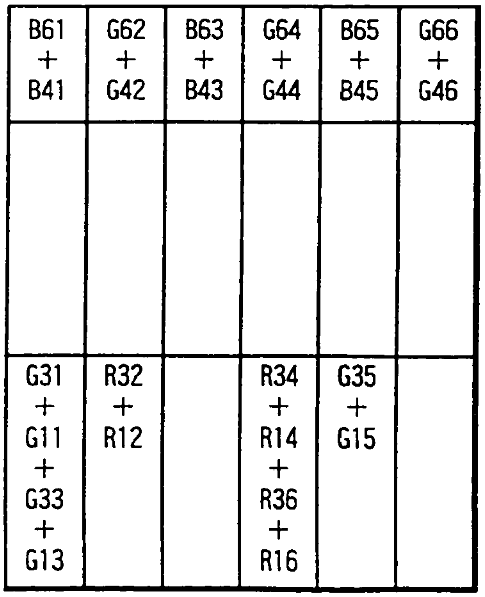

Next, by driving the horizontal CCD register 7 to shift by amount of two columns in the horizontal direction and then transferring signal charges in the remaining columns to the horizontal CCD register 7, as shown in FIG. 20C, those in the first column and the third column are added together to obtain signals G11+G13+G31+G33, R14+R16+R34+R36 derived from adding signal charges of pixels in four corners of the block, corresponding to pixels in the first row to the third row.

In other words, it is possible to transfer to the horizontal CCD register 7 the signal charges derived from adding signal charges of pixels in the first row to the third row of the block in the vertical direction and then add together the signal in the first column and the signal in the third column of each block.

The foregoing operation is also applied to signal charges B41+B61, G42+G62, B43+B63, G44+G64, B45+B65, G46+G66 derived from adding the charges corresponding to pixels in the fourth row to the sixth row.

Figure 20D:
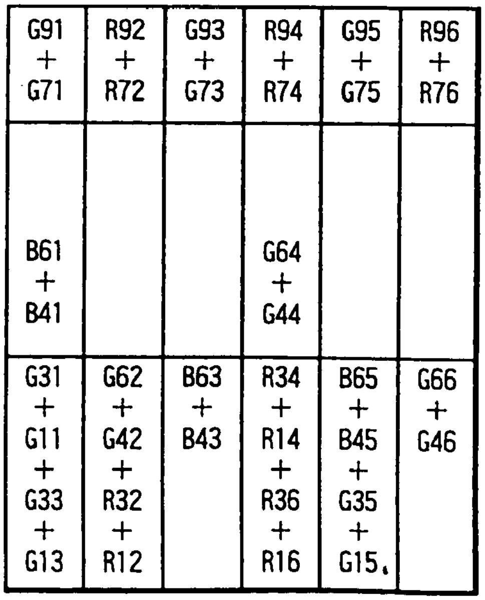

These added signal charges are transferred from the vertical CCD registers 4 to the control register section 6 and then transferred within the control register section 6. Thereafter, as shown in FIG. 20D, signal charges in two columns of the three columns, e.g. in the second column and the third column of each block are transferred to the horizontal CCD register 7.

Then, after the horizontal CCD register 7 is driven to make transfer for amount of two columns, signal charges in the remaining one column on standby, e.g. in the first column of each block are transferred to the horizontal CCD register 7, thereby allowing, as shown in FIG. 21E, signal charges B41+B43+B61+B63, G44+G46+G64+G66 derived from adding signal charges of pixels in four corners of the block corresponding to pixels in the fourth row to the sixth row, and signal charges R12+R32+G42+G62, G15+G35+B45+B65 derived from adding together signal charges of two shaded pixels in the middle column of the block shown in FIG. 17 and signal charges of two pixels in the middle column of the adjacent block, i.e. signal charges of four pixels in total to be obtained.

In addition, all packets of the horizontal CCD register 7 are filled with signal charges.

On this occasion, as shown in FIG. 17, signal charges G11+G13+G31+G33, R14+R16+R34+R36, B41+B43+B61+B63, G44+G46+G64+G66, etc. have the weight center of signals at the center of respective blocks and a relation of distance between the weight centers are similar to the relation of distance between the original color filters.

As to the remaining signals output from the image pickup device, e.g. R12+R32+G42+G62, etc. which are signal charges derived from adding signal charges of four pixels in total, i.e. the signal charges of two shaded pixels in the middle column of a block shown in FIG. 16 and the signal charges of two pixels in the middle column of the adjacent block, they are removed by a subsequent signal processing.

Therefore, the number of samples are reduced to one ninth of the number of pixels because a single sample is derived from nine pixels. Suppose that the driving frequency of the horizontal CCD register is constant, the frame rate will become six times relative to the normal operation.

Having described the embodiment which includes the vertical CCD register 4 of the three-phase driving system, other system, e.g. two-phase or four-phase system may be employed.

According to the aforesaid embodiment, because of the two pixel cycle in the horizontal direction and the vertical direction, and because of the processing by dividing into blocks each having nine pixels in a 3×3 pixel cycle, the pixels at corners of each block are always of the same color. Thus, different colors will not be mixed even if they are mixed. Therefore, it will be possible to reduce the number of samples to one ninth by adding and mixing signal charges which are three pixels apart in the horizontal and vertical directions within the block.

Moreover, the unnecessary pixel signals in the middle of the block are mixed with pixel signals in the middle of the adjacent block in the vertical direction and are then output from the CCD, thereby allowing the number of packets used for the unnecessary signals to be reduced and enabling the complication of the structure of CCD solid-state image pickup device to be avoided.

Because intervals between sample points can thus be made uniform in the horizontal and vertical directions (horizontal direction), the color arrangement of sample points which is similar to that of the color filters is obtained, which makes it possible to avoid the complication of signal processing algorithm.

In addition, the uniform intervals between the sampling points are also advantageous in the moire and the resolution.

Moreover, the addition improves the sensitivity.

Furthermore, since signal charges of partial pixels are utilized, the spacial low pass filtering effect is caused and so the moire may be reduced.

Figure 22:
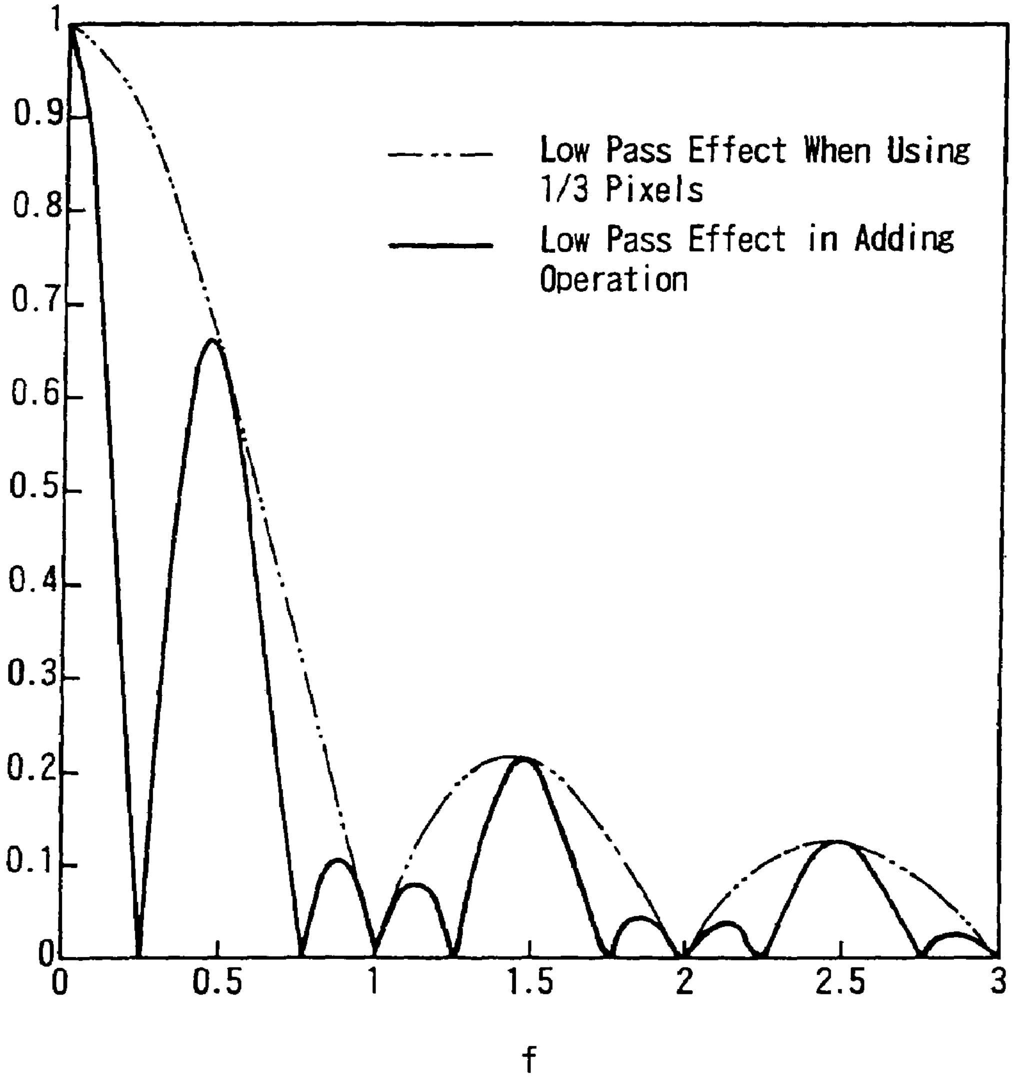
FIG. 22 is a graph for explaining by comparison the low pass effect due to the addition.

FIG. 22 shows the low pass filtering effect due to the addition.

Solid lines indicate the effect when two endmost pixels of three pixels are read out to be added and chain lines indicate the effect when one pixel out of three pixels is read out to be the signal output.

X-axis of FIG. 22 shows a frequency f when the cycle of pixel is made 1. In other words, in the normal operation, the sampling frequency is made 1. In the adding operation which derives one sample from three pixels, the sampling frequency is made one third.

Y-axis shows normalized response values in terms of relative value.

In addition, FIG. 22 shows a calculated version on the assumption that an opening factor of pixel is 100%.

When only one pixel out of three pixels is utilized, i.e. the only thinning out is performed as shown by chain lines, the substantial opening is the same as in the case of normal one sample from one pixel and is expressed by the next formula 1.

$$y(f)=|\sin c(f)| \qquad (1)$$

However, when the endmost pixels of three pixels are added to derive a single signal charge (mixed charge), the comb filtering is raised due to an effect of the addition and thus the substantial opening is expressed by the next formula 2.

$$y(f)=|\sin c(f)\cos(2\pi f)| \qquad (2)$$

It can be seen from FIG. 22 that the addition makes the low pass filtering effect to be caused and so the band width is restricted.

Also, when the sampling is made at a sampling frequency f=⅓, a response at f=⅓ shown in FIG. 19 is added to DC component of signal as a turn from the primary component.

Thus, observing y(⅓) in FIG. 22, it can be seen that by performing the addition, the turn from the primary to DC component is reduced by half from about 0.8 in case of thinning out shown by chain lines to about 0.4 in case shown by solid lines.

That is to say, the response as the turn becomes smaller by the addition, thereby causing the moire to be reduced.

Additionally, while in each of the aforesaid embodiments one block is defined as that having a three pixel cycle or 3×3 pixel cycle, the same applies in general if it has a cycle of three or more odd number pixels.

In this case, by specially driving the transfer register to add signal charges for obtaining mixed charges so that the weight center of pixel (pixel center) may coincide with a pixel at the center of one block, it will be possible to perform the fast operation due to the reduced amount of data and further to make the spacial distance relation between sampling points uniform.

When one block is defined as that having a cycle of five or more odd number pixels in the horizontal direction or in the vertical direction, because there are such pixels other than corner pixels, that have color filters of the same color as those of corner pixels, the driving to add these pixels is also possible. This will be more advantageous against the moire. However, the electrode structure and the driving method may be more complicated in same cases.

The present invention is also applicable to the solid-state image pickup apparatus of frame transfer type which includes pixels that are vertical registers having a light receiving function, in addition to the interline transfer type and the frame interline transfer type apparatus.

Further, the present invention is also applicable to the monocolor, or black and white solid-state imaging sensing apparatus. With the monocolor, or black and white solid-state image pickup apparatus, the amount of data is also reduced and the fast operation is enabled. At the same time, the moire can be reduced by adding signal charges.

Figure 23:
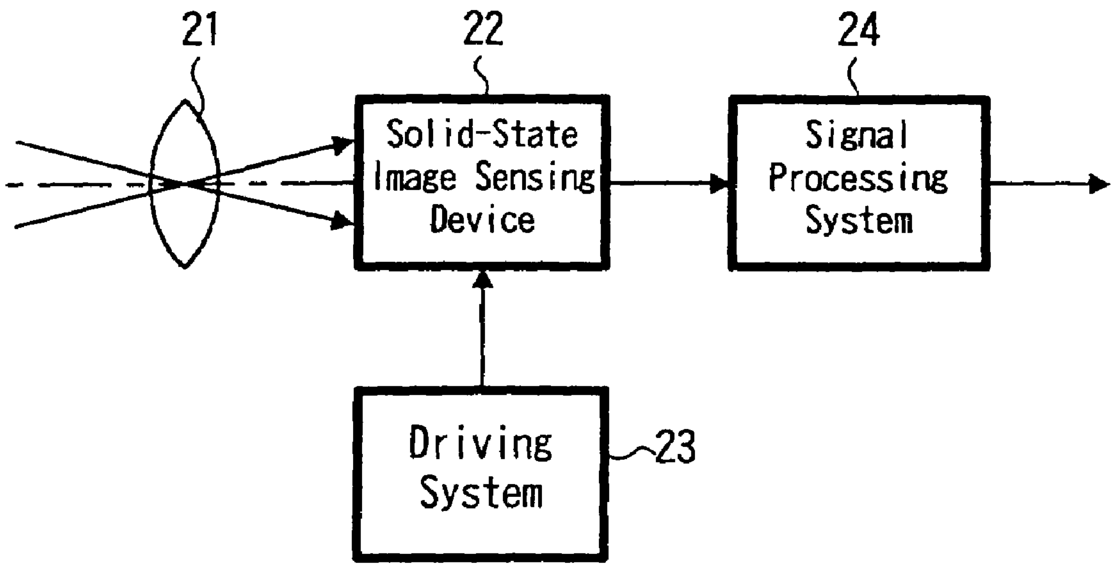
FIG. 23 is a schematic structure diagram (circuit block diagram) of one embodiment of the camera according to the present invention.

FIG. 23 shows a schematic structure of the camera according to the present invention using the above described solid-state sensing apparatus and the method for driving the same.

In FIG. 23, an incident light from an object is focused on an image pickup screen of a solid-state image pickup device 22 by means of an optical system including a lens 21. The solid-state image pickup device 22 has the same structure as that of the solid-state image pickup device used for the color CCD solid-state image pickup apparatus 1 shown in FIG. 4.

This solid-state image pickup device 22 is driven by a driving system 23 on the basis of the aforesaid driving method. An output signal of the solid-state image pickup device 22 is subjected to various signal processings through a signal processing system 24 into an image signal.

In the camera with the above described structure, a signal having an properly controlled dynamic range is output directly from the solid-state image pickup device 22. By inputting this output signal to the signal processing system 24 having the same structure as before, it will be possible to materialize a camera which has a high conformability with the conventional system.

Also, a mode of fast operation is established, in which mixed charges derived from adding a signal charge of one pixel in the middle of a block made up of three pixels in the horizontal direction and a signal charge of one pixel in the middle of the adjacent block are removed outside the solid-state image pickup device and mixed charges derived from adding together signal charges of two pixels except the middle of each block are utilized as an effective signal output. Alternatively, another mode of fast operation is established, in which mixed charges derived from adding signal charges of a total of four pixels, i. e. signal charges of two pixels except the middle row of the middle column of a block made up of a total of nine pixels including three pixels in the horizontal direction and three pixels in the vertical direction and signal charges of two pixels except the middle row of the middle column of the adjacent block are removed outside the solid-state image pickup device and mixed charges derived from adding together signal charges of four pixels in four corners of each block inside the solid-state image pickup device are utilized as an effective signal output.

If the camera is arranged to have a switching mode between the mode of fast operation and the normal mode of taking a picture, it will then be possible to obtain, when viewing through the electronic finder, an image of high dynamic resolution in quick response to a change of the amount of received light in the mode of fast operation. On the other hand, when taking a picture, it will be possible to make higher of the resolution of still picture in the normal mode of taking a picture.

The solid-state image pickup apparatus and the method for driving the same as well as the camera according to the present invention are not limited to the foregoing embodiments and various other constructions can be taken without departing from the gist of the present invention.

According to the aforesaid method for driving the solid-state image pickup apparatus of the present invention, because the signal charges of the predetermined pixel in each block made up of three or more odd number pixels are thinned out to be transferred to the transfer registers and then the addition is made so that the weight center of pixels (pixel center) may coincide with the central pixel of one block, it is possible to reduce the amount of data without spoiling the symmetry.

Moreover, due to the addition, the sensitivity is improved and the low pass filtering is caused, thereby enabling the occurrence of moire to be restricted.

According to the aforesaid method for driving the solid-state image pickup apparatus of the present invention, because one block is made up of three pixels in the horizontal direction or made up of nine pixels in total including three pixels in the horizontal direction and three pixels in the vertical direction, and three added signal charges are obtained from pixels in two blocks, the amount of data is reduced.

Furthermore, because the amount of data is reduced and the packets in the horizontal register are filled in full, the fast operation is enabled.

According to the aforesaid solid-state image pickup device of the present invention, because three transfer electrodes provided in a part of the vertical register on the horizontal register side are each formed from one layer of three different gate electrode layers, it is possible to construct the transfer electrode on the horizontal register side and the transfer electrode on the opposite side thereto by two layers of the three gate electrode layers, so that only three layers are sufficient to prepare the gate electrode layers for use including the vertical register and the horizontal register.

Moreover, because the three transfer electrodes are arranged in a cycle of three columns of the vertical register, it is possible to control the transfer of signal charges in a block made of the three columns, thereby allowing the operation of adding signal charges in the horizontal direction to be performed in this block unit.

According to the aforesaid camera of the present invention, because a single effective signal output is derived from pixels of one block made up of three pixels in the horizontal direction or a total of nine pixels including three pixels in the horizontal direction and three pixels in the vertical direction, the amount of data can be reduced to one third or one ninth. This makes it possible to operate faster than the normal operation. Therefore, it is possible to perform, e.g. the observing through a finder, the monitoring of an image pickup area and the like using this mode of operation.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. In a solid-state image pickup device in which a pixel is provided with a received light storage unit and a vertical register or a vertical register having a light receiving function, and which includes pixels in a two-dimensional arrangement and a horizontal register, a solid-state image pickup apparatus being characterized in that three transfer electrodes are provided per one column of the vertical register in a part of the vertical register on the horizontal register's side;

said three transfer electrodes are formed from one gate electrode layer; and said three transfer electrodes are arranged in a repeating cycle.

2. A solid-state image pickup device according to claim 1, characterized in that the transfer electrodes adjacent to said horizontal register out of said three transfer electrodes are formed from two gate electrode layers and the transfer electrodes on the opposite side to said horizontal register are formed from two gate electrode layers including a gate electrode layer not used for the transfer electrodes adjacent to said horizontal register.

* * * * *